United States Patent
Speakman et al.

(10) Patent No.: US 11,727,109 B2
(45) Date of Patent: Aug. 15, 2023

(54) IDENTIFYING ADVERSARIAL ATTACKS WITH ADVANCED SUBSET SCANNING

(71) Applicant: International Business Machines Corporation, Armonk, NY (US)

(72) Inventors: Skyler Speakman, Nairobi (KE); Celia Cintas, Nairobi (KE); Victor Abayomi Akinwande, Nairobi (KE); Srihari Sridharan, Nairobi (KE); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 16/776,554

(22) Filed: Jan. 30, 2020

(65) Prior Publication Data

US 2021/0232931 A1   Jul. 29, 2021

Related U.S. Application Data

(60) Provisional application No. 62/965,309, filed on Jan. 24, 2020.

(51) Int. Cl.
  *G06F 21/52*  (2013.01)
  *G06T 19/00*  (2011.01)
  (Continued)

(52) U.S. Cl.
  CPC .............. *G06F 21/52* (2013.01); *G06F 18/23* (2023.01); *G06F 18/2411* (2023.01);
  (Continued)

(58) Field of Classification Search
  CPC ........ G06N 3/088; G06N 3/0472; G06N 3/02; G06N 20/00; G06F 21/52
  See application file for complete search history.

(56) References Cited

U.S. PATENT DOCUMENTS 10,685,293 B1 *  6/2020  Heimann ................ G06N 20/00
10,819,724 B2 * 10/2020  Amiri ................... G06K 9/6267
(Continued)

FOREIGN PATENT DOCUMENTS

EP    3477553 A1    5/2019
WO   2019166397 A1   2/2019

OTHER PUBLICATIONS

Beggel et al., "Robust Anomaly Detection in Images using Adversarial Autoencoders," Jan. 18, 2019, 10 pages, https://arxiv.org/pdf/1901.06355v1.pdf.
(Continued)

*Primary Examiner* — Raymond L Nimox
(74) *Attorney, Agent, or Firm* — Shimon Benjamin; Otterstedt & Kammer PLLC

(57) ABSTRACT

An illustrative embodiment includes a method for detecting whether a given item within input data is anomalous. The method includes: extracting activations at respective nodes of an autoencoder trained on the data, the activations comprising activations at the respective nodes for the given item within the data and for one or more other items within the data; calculating p-values corresponding to the respective nodes, wherein the p-value for a given node represents a proportion of the activations at the given node for the other items which are greater than the activations at the given node for the given item; determining at least one score at least in part by scanning for a subset of the respective nodes which maximizes a statistical scoring function applied to the corresponding p-values; and providing a visualization of at least the given item within the input data to a human user.

20 Claims, 21 Drawing Sheets
(17 of 21 Drawing Sheet(s) Filed in Color)

(51) Int. Cl.

| | |
|---|---|
| *G06N 3/047* | (2023.01) |
| *G06N 3/02* | (2006.01) |
| *G06N 3/088* | (2023.01) |
| *G06N 20/00* | (2019.01) |
| *G06F 18/23* | (2023.01) |
| *G06F 18/2411* | (2023.01) |
| *G06V 10/764* | (2022.01) |
| *G06V 10/776* | (2022.01) |
| *G06V 10/82* | (2022.01) |

(52) U.S. Cl.
CPC ............. *G06N 3/047* (2023.01); *G06N 3/088* (2013.01); *G06N 20/00* (2019.01); *G06T 19/006* (2013.01); *G06V 10/764* (2022.01); *G06V 10/776* (2022.01); *G06V 10/82* (2022.01); *G06N 3/02* (2013.01)

(56) References Cited

U.S. PATENT DOCUMENTS

| | | | |
|---|---|---|---|
| 2013/0198119 A1* | 8/2013 | Eberhardt, III | G06N 20/00 706/12 |
| 2017/0279833 A1 | 9/2017 | Vasseur et al. | |
| 2019/0188212 A1* | 6/2019 | Miller | G06N 7/005 |
| 2019/0236402 A1 | 8/2019 | Goswami et al. | |
| 2019/0238568 A1 | 8/2019 | Goswami et al. | |
| 2019/0286506 A1 | 9/2019 | Cheng et al. | |
| 2019/0379589 A1* | 12/2019 | Ryan | G06N 3/084 |
| 2020/0387797 A1* | 12/2020 | Ryan | G06F 11/3006 |

OTHER PUBLICATIONS

Berk et al., "Goodness-of-Fit Test Statistics that Dominate the Kolmogorov Statistics," Zeitschrift für Wahrscheinlichkeitstheorie und verwandte Gebiete, Jan. 1979, v. 47, n. 1, p. 47-59, https://link.springer.com/article/10.1007/BF00533250.

Chen et al., "Non-Parametric Scan Statistics for Event Detection and Forecasting in Heterogeneous Social Media Graphs", Proceedings of the 20th ACM SIGKDD international conference on Knowledge discovery and data mining (KDD '14), Aug. 2014, p. 1166-1175, https://dl.acm.org/doi/10.1145/2623330.2623619.

Chen et al., "HopSkipJumpAttack: A Query-Efficient Decision-Based Attack", Sep. 17, 2019, 30 pages, https://arxiv.org/pdf/1904.02144v4.pdf.

Davis et al., "The relationship between precision-recall and roc curves", Proceedings of the 23rd international conference on Machine learning (ICML '06), Jun. 2006, p. 233-240, https://dl.acm.org/doi/10.1145/1143844.1143874.

Goodfellow et al., "Explaining and Harnessing Adversarial Examples", International Conference on Learning Representations (ICLR), Mar. 20, 2015, 11 pages, https://arxiv.org/pdf/1412.6572v3.pdf.

Hotelling, "Analysis of a complex of statistical variables into principal components", Journal of Educational Psychology, v. 24, 1933, p. 417-441.

Krizhevsky, "Learning Multiple Layers of Features from Tiny Images", Apr. 8, 2009, p. 1-58, https://www.cs.toronto.edu/~kriz/learning-features-2009-TR.pdf.

Kurakin et al., "Adversarial examples in the physical world", International Conference on Learning Representations (ICLR), Feb. 11, 2017, 14 pages, https://arxiv.org/pdf/1607.02533v4.pdf.

LeCun et al., "Gradient Based Learning Applied to Document Recognition", Proceedings of IEEE, v. 86, n. 11, Nov. 1998, p. 2278-2324, https://ieeexplore.ieee.org/document/726791.

Madry et al., "Towards Deep Learning Models Resistant to Adversarial Attacks", Sep. 4, 2019, 28 pages, https://arxiv.org/pdf/1706.06083v4.pdf.

McFowland et al., "Fast Generalized Subset Scan for Anomalous Pattern Detection", Journal of Machine Learning Research (JMLR), v. 14, Jun. 2013, p. 1533-1561, http://www.jmlr.org/papers/volume14/mcfowland13a/mcfowland13a.pdf.

McFowland et al., "Efficient Discovery of Heterogeneous Treatment Effects in Randomized Experiments via Anomalous Pattern Detection", Jun. 7, 2018, 41 pages, https://arxiv.org/pdf/1803.09159v2.pdf.

Meng et al, "MagNet: A Two-Pronged Defense against Adversarial Examples", Proceedings of the 2017 ACM SIGSAC Conference on Computer and Communications Security (CCS '17), Oct. 2017, p. 135-147, https://dl.acm.org/doi/10.1145/3133956.3134057.

Moosavi-Dezfooli et al., "DeepFool: A Simple and Accurate Method to Fool Deep Neural Networks", Proceedings of the IEEE Conference on Computer Vision and Pattern Recognition (CVPR), Jun. 2016, p. 2574-2582, https://ieeexplore.ieee.org/abstract/document/7780651.

Neill, "Fast subset scan for spatial pattern detection", Journal of the Royal Statistical Society (Series B: Statistical Methodology), v. 74, n. 2, Mar. 2012, p. 337-360, https://onlinelibrary.wiley.com/doi/abs/10.1111/j.1467-9868.2011.01014.x.

Nicolae et al., "Adversarial Robustness Toolbox v1.0.0", Nov. 15, 2019, 34 pages, https://arxiv.org/pdf/1807.01069v4.pdf.

Papernot et al., "On the Effectiveness of Defensive Distillation", Jul. 18, 2016, 4 pages, https://arxiv.org/pdf/1607.05113v1.pdf.

Sahay et al,, "Combatting adversarial attacks through denoising and dimensionality reduction: A cascaded autoencoder approach", 2019 53rd Annual Conference on Information Sciences and Systems (CISS), Mar. 2019, 6 pages, https://ieeexplore.ieee.org/document/8692918.

Sakurada et al., "Anomaly detection using autoencoders with non-linear dimensionality reduction", Proceedings of the MLSDA 2014 2nd Workshop on Machine Learning for Sensory Data Analysis, Dec. 2014, p. 4-11, https://dl.acm.org/doi/10.1145/2689746.2689747.

Samangouei et al., "Defense-GAN: Protecting Classifiers Against Adversarial Attacks Using Generative Models", International Conference on Learning Representations (ICLR), May 18, 2018, 17 pages, https://arxiv.org/pdf/1805.06605v2.pdf.

Schölkopf et al., "Estimating the Support of a High-Dimensional Distribution", Neural Computation, v. 13, n. 7, Jul. 2001, p. 1443-1471, https://www.mitpressjournals.org/doi/pdf/10.1162/089976601750264965.

Szegedy et al., "Intriguing properties of neural networks", Feb. 19, 2014, 10 pages, https://arxiv.org/pdf/1312.6199v4.pdf.

Van der Maaten et al., "Visualizing Data using t-SNE", Journal of Machine Learning Research (JMLR), v. 9, Nov. 2008, p. 2579-2605, http://jmlr.org/papers/volume9/vandermaaten08a/vandermaaten08a.pdf.

Xiao et al., "Fashion-MNIST: a Novel Image Dataset for Benchmarking Machine Learning Algorithms", Sep. 15, 2017, 6 pages, https://arxiv.org/pdf/1708.07747v2.pdf.

Zeiler, "ADADELTA: An Adaptive Learning Rate Method", Dec. 22, 2012, 6 pages, https://arxiv.org/pdf/1212.5701v1.pdf.

Zhai et al., "Deep Structured Energy Based Models for Anomaly Detection", Proceedings of the 33rd International Conference on International Conference on Machine Learning (ICML '16), Proceedings of Machine Learning Research (PMLR), v. 48, Jun. 2016, http://proceedings.mlr.press/v48/zhai16.pdf.

Zhou et al., "Anomaly detection with robust deep autoencoders", Proceedings of the 23rd ACM SIGKDD International Conference on Knowledge Discovery and Data Mining (KDD '17), Aug. 2017, p. 665-674, https://dl.acm.org/doi/10.1145/3097983.3098052.

* cited by examiner

201 input  : Background set of images: $X_z \in D^{H_0}$, Evaluation Image: $X_i$, training dataset, $\alpha_{max}$.
202 output: $S_E^*$ Score for $X_i$
203 $AE \leftarrow$ TrainNetwork (training dataset);
204 $AE_y \leftarrow$ Some flattened layer of $AE$;
205 for $z \leftarrow 0$ to $M$ do
206     for $j \leftarrow 0$ to $J$ do
207         $A_{zj}^{H_0} \leftarrow$ ExtractActivation $(AE_y, X_z)$
208     end
209 end
210 for $j \leftarrow 0$ to $J$ do
211     $A_{ij} \leftarrow$ ExtractActivation $(AE_y, X_i)$
212     $p_{ij} = \frac{\sum_{X_z \in D^{H_0}} I(A_{zj} >= A_{ij}) + 1}{M+1}$;
213 end
214 $p_{ij}^* = \{y < \alpha_{max} \; \forall y \subseteq p_{ij}\}$;
215 $p_{ij}^* \leftarrow$ SortAscending $(p_{ij}^*)$;
216 for $k \leftarrow 1$ to $J$ do
217     $S_{(k)} = \{p_y \subseteq p_{ij}^* \forall y \in \{1, \ldots, k\}\}$;
218     $\alpha_k = max(S_{(k)})$;
219     $F(S_{(k)}) \leftarrow$ NPSS $(\alpha_k, k, k)$;
220 end
221 $k^* \leftarrow \arg\max F(S_{(k)})$;
222 $\alpha^* = \alpha_{k^*}$;
223 $S^* = S_{(k^*)}$;
224 return $S^*$, $\alpha^*$, and $F(S^*)$

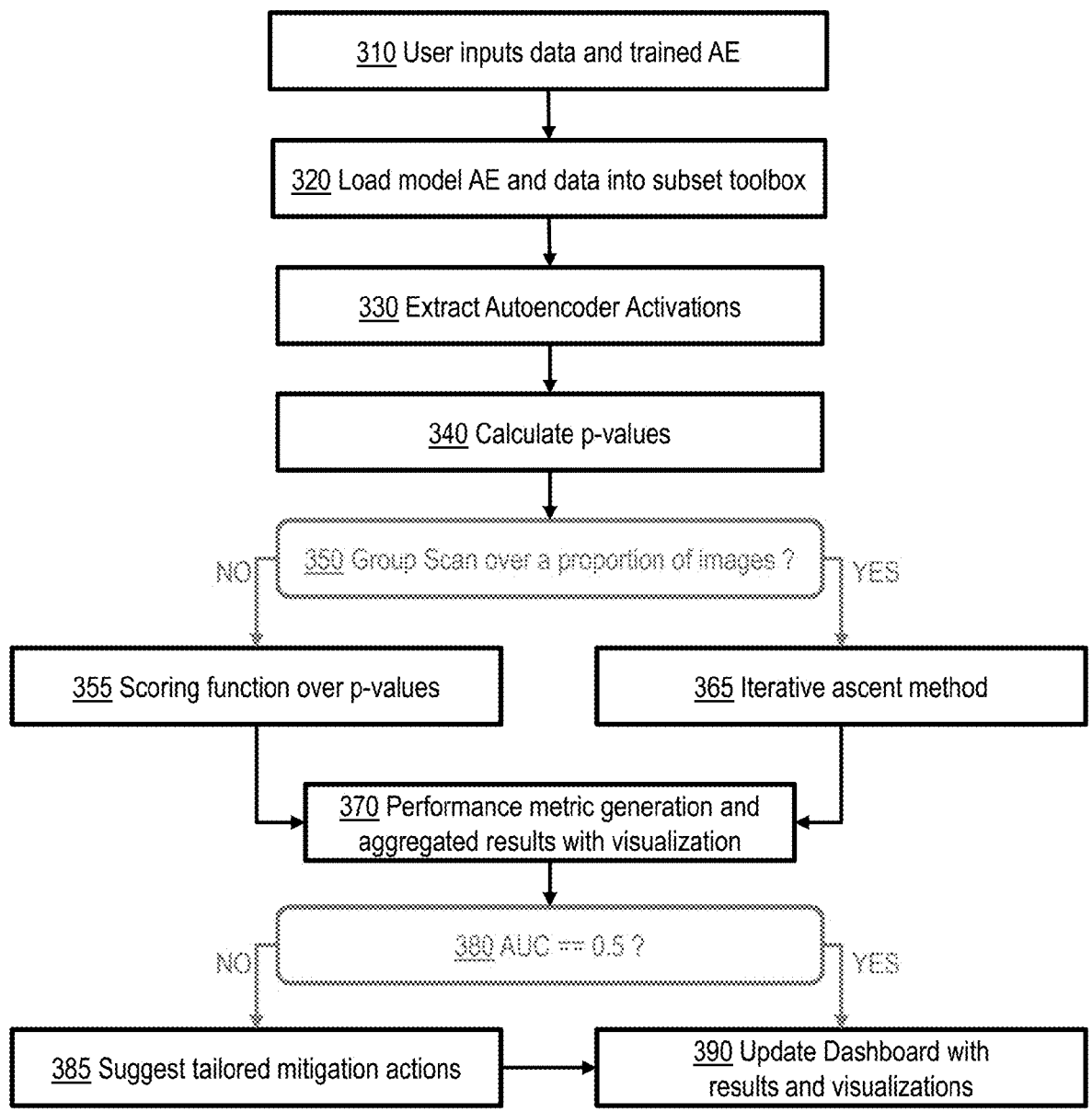

| Layers | Clean Training | | | | | | | | Noised (1%) | Noised (9%) |
| | F-MNIST | | | | MNIST | | | | F-MNIST | F-MNIST |
| | BIM | FGSM | DF | HSJ | BIM | FGSM | DF | HSJ | BIM | BIM |
|---|---|---|---|---|---|---|---|---|---|---|
| conv2d_1 | 0.964 | 0.974 | 0.965 | 0.859 | 1.0 | 1.0 | 0.999 | 1.0 | 0.909 | 0.823 |
| max_pool_1 | 0.972 | 0.979 | 0.965 | 0.861 | 1.0 | 1.0 | 0.999 | 1.0 | 0.928 | 0.850 |
| conv2d_2 | 0.519 | 0.530 | 0.686 | 0.515 | 0.975 | 0.941 | 0.953 | 0.998 | 0.441 | 0.700 |
| max_pool_2 | 0.500 | 0.513 | 0.634 | 0.451 | 0.855 | 0.809 | 0.837 | 0.906 | 0.424 | 0.693 |
| conv2d_3 | 0.500 | 0.507 | 0.481 | 0.478 | 0.382 | 0.384 | 0.443 | 0.617 | 0.470 | 0.469 |
| max_pool_3 | 0.473 | 0.478 | 0.479 | 0.432 | 0.374 | 0.373 | 0.423 | 0.523 | 0.451 | 0.450 |
| conv2d_4 | 0.403 | 0.406 | 0.483 | 0.247 | 0.270 | 0.271 | 0.261 | 0.349 | 0.472 | 0.410 |
| up_sampl_1 | 0.403 | 0.406 | 0.483 | 0.247 | 0.270 | 0.271 | 0.261 | 0.349 | 0.472 | 0.410 |
| conv2d_5 | 0.413 | 0.419 | 0.474 | 0.282 | 0.228 | 0.228 | 0.193 | 0.161 | 0.356 | 0.388 |
| up_sampl_2 | 0.413 | 0.419 | 0.474 | 0.282 | 0.228 | 0.228 | 0.193 | 0.161 | 0.346 | 0.388 |
| conv2d_6 | 0.342 | 0.350 | 0.483 | 0.331 | 0.259 | 0.261 | 0.285 | 0.255 | 0.306 | 0.323 |
| up_sampl_3 | 0.342 | 0.350 | 0.483 | 0.331 | 0.259 | 0.261 | 0.285 | 0.255 | 0.306 | 0.323 |
| conv2d_7 | 0.594 | 0.597 | 0.506 | 0.691 | 0.693 | 0.688 | 0.848 | 0.882 | 0.613 | 0.603 |

FIG. 11

| Datasets | Attacks | Detection Power (AUCROC) | | |
|---|---|---|---|---|
| | | Ours RE | Mean RE | One-SVM |
| F-MNIST | BIM | 0.698 | 0.641 | 0.478 |
| | FGSM | 0.672 | 0.630 | 0.497 |
| | DF | 0.599 | 0.477 | 0.534 |
| | HSJ | 0.956 | 0.935 | 0.546 |
| MNIST | BIM | 0.998 | 0.751 | 0.624 |
| | FGSM | 0.983 | 0.725 | 0.624 |
| | DF | 0.992 | 0.574 | 0.637 |
| | HSJ | 0.999 | 0.619 | 0.537 |

FIG. 12

| Datasets | Epsilon ($\epsilon$) | Detection Power (AUCROC) | | |
|---|---|---|---|---|
| | | Defense-GAN | Subset Scan Rec Error | Subset Scan AE |
| F-MNIST | 0.01 | 0.353 | 0.672 | 0.974 |
| | 0.10 | 0.775 | 0.984 | 0.998 |
| | 0.15 | 0.884 | 0.995 | 0.999 |
| | 0.20 | 0.940 | 0.998 | 0.999 |
| | 0.25 | 0.969 | 0.999 | 0.999 |
| MNIST | 0.01 | 0.234 | 0.983 | 1.0 |
| | 0.10 | 0.914 | 0.999 | 1.0 |
| | 0.15 | 0.975 | 0.999 | 1.0 |
| | 0.20 | 0.989 | 1.0 | 1.0 |
| | 0.25 | 0.998 | 1.0 | 1.0 |
| CIFAR | 0.10 | 0.410 | 0.600 | 0.755 |
| | 0.15 | 0.425 | 0.710 | 0.903 |
| | 0.20 | 0.435 | 0.813 | 0.971 |
| | 0.25 | 0.446 | 0.889 | 0.993 |
| | 0.30 | 0.503 | 0.935 | 0.997 |

900

IDENTIFYING ADVERSARIAL ATTACKS WITH ADVANCED SUBSET SCANNING

CROSS REFERENCE TO RELATED APPLICATIONS

This application claims the benefit of U.S. Provisional Application 62/965,309 filed 24 Jan. 2020. The complete disclosure of U.S. Provisional Application 62/965,309 filed 24 Jan. 2020 is expressly incorporated herein by reference in its entirety for all purposes.

BACKGROUND

The present invention relates to the electrical, electronic and computer arts, and, more particularly, to improvements in anomalous pattern detection for neural networks.

Deep learning models have drastically improved the state of the art in speech recognition, visual object recognition, object detection and many other domains. Neural networks generate a large amount of activation data when processing an input. The goal of anomalous pattern detection is to quantify, detect, and characterize the data that are generated by an alternative process. Examples of an anomalous input can include poisoning techniques by an adversary involving noised samples, human annotation errors, etc. For example, deep neural networks are susceptible to adversarial perturbations of their input data that can cause a sample to be incorrectly classified. Usually, these perturbations contain small variations in the pixel space that cannot be detected by a human but can change the output of a classifier drastically.

Autoencoders (AE) differ from classical classifier networks as they do not require labels because the expected output is the input data. AE neural networks learn to reconstruct normal images while being trained to minimize the reconstruction error. AE neural networks can hence classify images as anomalous if the reconstruction error exceeds a given threshold. During the prediction step, attack detection can be performed by looking at the distribution of the mean reconstruction error for clean and noised samples. Using this type of adversarial detection with autoencoders assumes that the model is properly trained with clean data. Otherwise, this manifold can be used advantageously by training the autoencoder with corrupted samples that are mapped to clean samples. Thus, upon the introduction of a perturbation, the magnitude of each arrow in the vector field will indicate the direction in which the data must be moved to map the sample to its clean representation.

The vulnerability of these networks to adversarial examples implies a security risk in applications with real-world consequences, such as self-driving cars, robotics and financial services. Proper detection of adversarial attacks is a key component to create effective defense mechanisms for deep neural networks. However, techniques for efficiently detecting adversarial attacks often rely on training data augmentation or specialized training techniques. For example, most methods discussed in literature require that the training data only consist of normal examples such as denoising autoencoders. However, this alone has no guarantee for anomalies to have a large reconstruction error. Thus, many conventional techniques require retraining of the model with adversarial examples and altering loss functions during the training step so that adversarial images must have a higher perturbation.

Reliably detecting anomalies in a given set of images is a task of high practical relevance for visual quality inspection, surveillance, or medical image analysis. However, access to clean training data is required by standard deep denoising autoencoders. Since anomalies are rare and come from diverse sources, it is not feasible to obtain labeled datasets of all possible anomalies/attacks. For example, because adversarial attacks are becoming increasingly sophisticated, come from unknown diverse sources and each year new defense techniques appear, it is not feasible to obtain labeled datasets of all possible attacks or build specific detection mechanisms per each type of attack. In real-world machine learning applications, large outliers and pervasive noise are commonplace, and access to clean training data as required by standard deep autoencoders is unlikely. There is a long-felt but unmet need for an unsupervised method for anomaly detection under autoencoders activations, and more specifically for an unsupervised method for detecting adversarial attacks in inner layers of autoencoders.

SUMMARY

An illustrative embodiment includes a method for detecting whether a given item within input data is anomalous. The method includes: extracting activations at respective nodes of an autoencoder trained on the data, the activations comprising activations at the respective nodes for the given item within the data and for one or more other items within the data; calculating p-values corresponding to the respective nodes, wherein the p-value for a given node represents a proportion of the activations at the given node for the other items which are greater than the activations at the given node for the given item; determining at least one score at least in part by scanning for a subset of the respective nodes which maximizes a statistical scoring function applied to the corresponding p-values; and providing a visualization of at least the given item within the input data to a human user.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. An illustrative embodiment may include methods and systems to quantify, detect, and characterize data that is generated by an alternative process (e.g., anomalies, outliers, adversarial attacks, human input errors, etc.) using subset scanning over deep autoencoder activations. Anomalous input can be detected by applying anomalous pattern detection techniques on autoencoder activation data.

An illustrative embodiment of the present invention provides an unsupervised method for anomaly detection under autoencoders activations, and more specifically an unsupervised method for detecting adversarial attacks in inner layers of autoencoders. An illustrative embodiment builds on subset scanning methods to enhance the adversarial attacks detection power of AEs in an unsupervised manner and without a priori knowledge of the attack or labeled examples. For example, subset scanning over AE activation can be used for adversarial attack detection in the inner layers of the autoencoder. An illustrative embodiment can detect a malicious actor performing a man-in-the-middle attack and adding an adversarial universal perturbation to inputs (e.g., from a sensor or imaging device).

An illustrative embodiment may combine detection with reconstruction error and subset scanning scores to improve the anomaly (e.g., adversarial attack) detection of current autoencoders without requiring any retraining. An illustrative embodiment can distinguish samples from different types of adversarial attacks under the activation and reconstruction error space. Thus, an illustrative embodiment can effectively quantify, detect, and characterize the data that are generated by different adversarial attacks.

An illustrative embodiment may provide the ability to identify and visualize the set of anomalous nodes in the reconstruction error space that make noised samples. Thus, an illustrative embodiment is able to not only point out which image looks perturbed but also indicate which nodes make the input a noised sample. An illustrative embodiment may provide detection of anomalous activity at the individual neuron level and/or detection of anomaly sources other than adversarial noise.

These and other features and advantages of the present invention will become apparent from the following detailed description of illustrative embodiments thereof, which is to be read in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 shows pseudocode for subnet scanning over autoencoder activations according to an illustrative embodiment of the present invention;

FIG. 3 is a flowchart showing step-by-step computation according to an illustrative embodiment of the present invention;

FIG. 8 is a table showing experimental results produced by one or more illustrative embodiments of the invention, specifically detection power for subset scanning over respective layers of an autoencoder;

FIG. 11 is a table showing experimental results produced by one or more illustrative embodiments of the invention, specifically detection power for subset scanning with various values;

FIG. 12 is a table showing experimental results produced by one or more illustrative embodiments of the invention, specifically detection power for subset scanning over reconstruction error space under different adversarial attacks;

DETAILED DESCRIPTION

Figure 1:
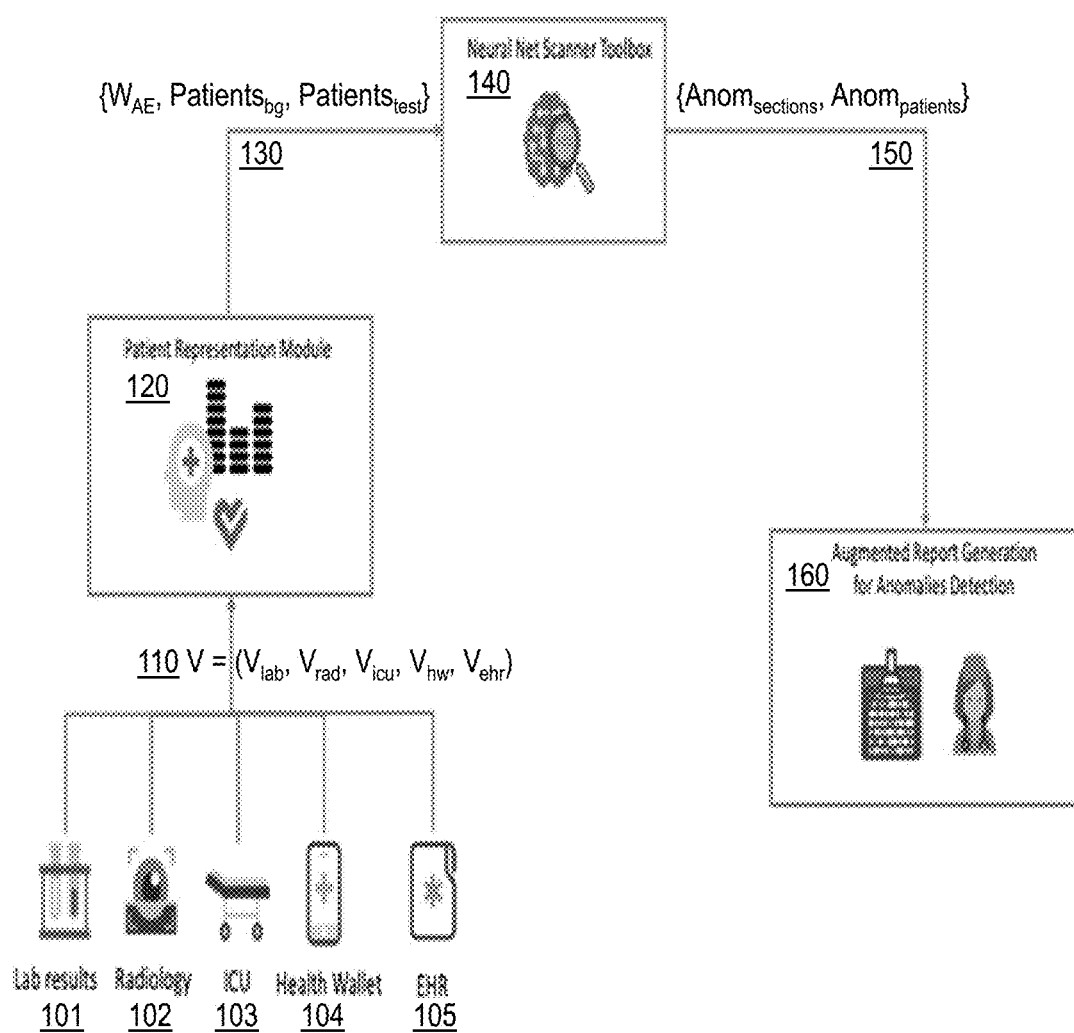
FIG. 1 is a combined block/flow diagram showing an example scenario for use of an illustrative embodiment of the present invention.

An illustrative embodiment may include methods and systems to quantify, detect, and characterize data that is generated by an alternative process (e.g., anomalies, outliers, adversarial attacks, human input errors, etc.) using subset scanning over deep autoencoder activations. Anomalous input can be detected by applying anomalous pattern detection techniques on autoencoder activation data. A first machine learning model may be trained to extract data (activations) for artificial neural networks (e.g., deep autoencoders) from a plurality of data sources that may contain one or more adversarial attacks. A second machine learning model may be trained to quantify the anomalousness of activations within a neural network using the extracted activations data. A third machine learning model may be trained to detect when anomalous patterns are present for a given input. The first, second and third machine learning models be used to characterize the anomaly by identifying the nodes participating in the anomalous pattern.

In an illustrative embodiment, anomalies may include adversarial datapoints (data that is designed and intended to cause a misclassification in the model), new class label (a datapoint that belonging to a new class, e.g., a class that the model was not trained to identify), generated datapoint (a datapoint that is obtained from a generative model trained based on knowledge of the background data). Anomalies may be present in a variety of datasets with each dataset requiring specific adaptations to the core functionality of subset scanning in the representation space of models built using such dataset. In an illustrative embodiment, datasets may be grouped into four broad areas: Images (e.g., X-rays, Human faces, or Handwriting), Audio (e.g., recorded speech), Video (e.g., Captioned video), and Tabular data (e.g., Patterns of healthcare).

An illustrative embodiment of the present invention provides an unsupervised method for anomaly detection under autoencoders activations, and more specifically an unsupervised method for detecting adversarial attacks in inner layers of autoencoders. An illustrative embodiment builds on subset scanning methods to enhance the adversarial attacks detection power of AEs in an unsupervised manner and without a priori knowledge of the attack or labeled examples. For example, subset scanning over AE activation can be used for adversarial attack detection in the inner layers of the autoencoder.

An illustrative embodiment may combine detection with reconstruction error and subset scanning scores to improve the anomaly (e.g., adversarial attack) detection of current autoencoders without requiring any retraining. An illustrative embodiment can distinguish samples from different types of adversarial attacks under the activation and reconstruction error space. Thus, an illustrative embodiment can effectively quantify, detect, and characterize the data that are generated by different adversarial attacks. Principles of the present invention may be used generally with any pretrained off-the-shelf autoencoder network. Moreover, an illustrative embodiment can be integrated with the Adversarial Robustness Toolbox available from the assignee of the present application, International Business Machines Corp.

An illustrative embodiment may provide a novel unsupervised method for adversarial attacks detection with off-the-shelf AEs and subset scanning. In an illustrative embodiment, subset scanning can be used to gain detection strength against multiple adversarial attacks and different parameters of the same attack on images across several datasets and with noise proportions induced in the training step. This is done without requiring any retraining or complex deep AE network structures.

FIG. 1 is a combined block/flow diagram showing an example scenario for use of an illustrative embodiment of the present invention. Within hospital 100, data 110 about a patient may be obtained from a plurality of data sources including lab results 101, radiology results 102, equipment monitoring the patient in intensive care unit (ICU) 103, health wallet 104, and electronic health records 105. Within patient representation module 120, an autoencoder model may be used to predict 130 a future state of the patient by learning suitable representations 110 from the data sources 101-105. These predictions may include WAE (the trained weights of the autoencoder model), Patients$_{bg}$ (a group of "background" patients under normal conditions) and Patients$_{test}$ (a sample of the patients to be scanned or evaluated for possible adversarial attacks).

However, a certain imaging equipment may develop a fault or be hacked, thereby introducing anomalies into health records for a number of patients that could potentially lead to erroneous life-threatening predictions. Thus, the neural net scanner toolbox 140 continuously monitors the autoencoder model 120 and its predictions 130 for adversarial or anomalous input. The anomalous subset of records 150 belonging to affected patients are scored higher by the system to identify anomalous sections Anom$_{sections}$, and anomalous patients Anom$_{patients}$. Module 160 reports the anomalous subset of records 150 to health care professionals, allowing them to trace/establish the cause of anomalous sources. Module 160 may include augmented report generation for anomalies detection. Module 160 may prompt health care professionals to take appropriate measures, e.g., using augmented reality (AR) glasses or virtual reality (VR) glasses.

As previously noted, autoencoder (AE) neural networks learn to reconstruct normal images while being trained to minimize the reconstruction error. AE neural networks can hence classify images as anomalous if the reconstruction error exceeds a given threshold. In an illustrative embodiment, a conventional autoencoder learns the underlying manifold of the training data, which is used to reconstruct the input (x) as the output (x').

Generally, the architecture of an autoencoder includes an encoder and a decoder. The encoder (e: X→Z) is composed of one or more layers that perform nonlinear dimensionality reduction from the high dimensional input space into a low-dimensional latent representation: z=e(x), while the decoder (d: Z→X) reconstructs the original sample from the latent representation: x'=d(e(x)).

The autoencoder is optimized by minimizing the reconstruction error L(x, x'). In an illustrative embodiment, the anomalous pattern detection system may be performed on a trained autoencoder to enhance anomaly detection properties by looking at the distributions of mean reconstruction error L(w, d(e(w))) when w in X$_{clean}$ (clean training data) and L(w', d(e(w'))) when w' in X$_{adv}$ (adversarial or noised trained data).

An illustrative embodiment may employ subset scanning scores distributions along the layers of the encoder. During the untangling (encoding) phase (z=e(x)) of information reduction from the input space to the latent representation (z), an illustrative embodiment may observe until which layer the input (clean and noised) may be discriminated to the distribution learnt by the autoencoder. An illustrative embodiment may determine if reconstruction error criterion suffices for detection of anomalies in training autoencoder based anomaly detectors via subset scanning methods applied on the reconstruction error space.

An illustrative embodiment may implement Fast Generalized Subset Scan (FGSS) optimization methods described in, e.g., McFowland et al., "Fast Generalized Subset Scan for Anomalous Pattern Detection", Journal of Machine Learning Research (JMLR), v. 14, June 2013, p. 1533-1561 (hereinafter "McFowland"), which is incorporated by reference herein for all purposes. Specifically, an illustrative embodiment may implement FGSS with scoring functions, search groups, and alpha thresholds. However, an illustrative embodiment extends the teachings of McFowland to autoencoder networks, adversarial attacks, and out-of-distribution samples.

Subset scanning treats the pattern detection problem as a search for the "most anomalous" subset of observations in the data. Herein, anomalousness is quantified by a scoring function, F(S) which is typically a log-likelihood ratio statistic. Therefore, the goal is to efficiently identify S*=arg max$_S$ F(S) over all relevant subsets of node activations within an autoencoder that is processing an image at runtime.

FIG. 2 shows pseudocode for a procedure 200 for subset scanning over autoencoder activations according to an illustrative embodiment of the present invention. As shown in line 201, the procedure 200 takes as input a set of M background images X$_z$∈D$^{H_0}$, a test image under evaluation (evaluation image) X$_i$∉D$^{H_0}$, an alpha threshold α$_{max}$ (further discussed below with reference to line 214), and a training dataset. D$^{H_0}$ refers to a set of records under normal conditions, rather than attacked samples. Thus, in some embodiments, D$^{H_0}$ may correspond to patients$_{bg}$ discussed above with reference to FIG. 1, with X being within patients$_{test}$ rather than patients$_{bg}$. As shown in line 202, the procedure 200 produces as output a score S* for the evaluation image X. In line 203, the neural network autoencoder AE is trained using the training dataset. In line 204, a flattened (preferably inner) layer of the autoencoder AE is denoted as AE$_y$, where AE$_y$ includes a set O of J nodes.

Lines 205-209 extract activation data produced at layer AE$_y$ by background images X$_z$. In line 207, a given background image within X$_z$ generates activations A$_{zj}^{H_0}$ at a given node O$_j$ within layer AE$_y$. In lines 206-208, step 207 is repeated for each of the J nodes within layer AE$_y$. In lines 205-209, lines 206-208 are repeated for each of the M background images within X$_z$.

Lines 210-213 extract activation data produced at layer AE$_y$ by evaluation image X. In line 211, evaluation image X creates activations A$_{ij}$ at a given node O$_j$ within layer AE$_y$. In line 212, each p-value in p$_{ij}$ is the proportion of background activations A$_{zj}^{H_0}$ greater than the test image-induced activation A$_{ij}$ at node O$_j$. This notion is extended in McFowland to p-value ranges such that p$_{ij}$ is uniformly distributed between p$_{ij}^{min}$ and p$_{ij}^{max}$. Line 212 makes a simplifying assumption to only consider a range by its upper bound defined as:

$$p_{ij} = \frac{\sum_{X_z \in D^{H_0}} I(A_{zj} \geq A_{ij}) + 1}{M + 1}.$$

In lines 210-213, lines 211 and 212 are repeated for each of the J nodes within layer AEy. Thus, the test image X is converted to a vector of p-values p$_{ij}$ of length J=|O|, i.e., the number of nodes in the network under consideration.

Next, use non-parametric scan statistics (NPSS) to identify and quantify the set of p-values. Although subset scanning can use parametric scoring functions (e.g., Gaussian, Poisson), the distribution of activations within particular layers are highly skewed and in some cases bi-modal. Thus, the illustrative embodiment in FIG. 2 uses non-parametric scan statistics (NPSS) that make minimal assumptions on the underlying distribution of node activations.

The key assumption is that under the alternative hypothesis H$_1$ of an anomaly present in the activation data, then at least some subset of the activations S$_O \subseteq$ O will systematically appear extreme. NPSS provides a means to evaluate the anomalousness of a subset of node activations S$_O$. However, the exhaustive search over groups quickly becomes computationally infeasible due to the exponential number of subsets of records. Discovering which of the 2^J possible subsets provides the most evidence of an anomalous pattern is computationally infeasible for moderately sized data sets. However, NPSS has been shown to satisfy the linear-time subset scanning (LTSS) property, which allows for an efficient and exact maximization over all subsets of data without requiring an exhaustive search. See, e.g., Neill, "Fast subset scan for spatial pattern detection", Journal of the Royal Statistical Society (Series B: Statistical Methodology), v. 74, n. 2, March 2012, p. 337-360, which is incorporated by reference herein for all purposes.

The LTSS property essentially reduces the search space from 2^N to N for a dataset with N records while guaranteeing that the highest-scoring subset of records is identified. The LTSS property uses a priority function G(O$_j$) to rank nodes and then proves that the highest-scoring subset consists of the "top-k" priority nodes for some k in 1 . . . J, as shown in line 216. The priority of a node for NPSS is the proportion of p-values that are less than α. However, because we are scoring a single image and there is only one p-value at each node, the priority of a node is either 1 (when the p-value is less than α) or 0 (otherwise). Therefore, for a given fixed α threshold, the most anomalous subset is all and only nodes with p-values<α.

In order to maximize the scoring function over a, first consider only p-values less than the maximum threshold α$_{max}$ in line 214, then sort the O$_j$ nodes by their p-values in line 215. In line 217, let S$_{(k)}$ be the subset containing the k nodes with the smallest p-values. In line 218, let α$_k$ be the largest p-value among these k nodes. The LTSS property guarantees that the highest-scoring subset (over all a thresholds) will be one of these J subsets S$_{(1)}$, S$_{(2)}$, . . . S$_{(J)}$ with their corresponding α$_k$ threshold. Any subset of nodes that does not take this form (or uses an alternate α$_k$) is provably sub-optimal and not considered. This drastically reduced search space still guarantees in identifying the highest-scoring subset of nodes for a test image under evaluation.

The general form of the NPSS score function in line 219 is $$F(S) = \max_\alpha F_\alpha(S) = \max_\alpha \phi(\alpha, N_\alpha(S), N(S))$$

where N(S) represents the number of empirical p-values contained in subset S and N$_\alpha$(S) is the number of p-values less than (significance level) α contained in subset S. It was shown in McFowland that for a subset S consisting of N(S) empirical p-values, the expected number of significant p-value ranges under the null hypothesis H$_0$ is E[N$_\alpha$(S)]=N (S)α. Assume an anomalous process will create some S where the observed significance is higher than expected, N$_\alpha$(S)>N(S)α for some α.

There are well-known goodness-of-fit statistics that can be utilized in NPSS, as discussed in McFowland et al., "Efficient Discovery of Heterogeneous Treatment Effects in Randomized Experiments via Anomalous Pattern Detection", Jun. 7, 2018, 41 pages, which is incorporated by reference herein for all purposes. Solely by way of example, an illustrative embodiment of the present invention may use the Berk-Jones test statistic:

$$\phi_{BJ}(\alpha, N_\alpha, N) = N * KL\left(\frac{N_\alpha}{N}, \alpha\right),$$

where KL is the Kullback-Liebler divergence $$KL(x, y) = x \log\frac{1-x}{1-y}$$

between the observed and expected proportions of significant p-values. Berk-Jones can be interpreted as the log-likelihood ratio for testing whether the p-values are uniformly distributed on [0; 1]. Berk-Jones is further described in, e.g., Berk et al., "Goodness-of-Fit Test Statistics that Dominate the Kolmogorov Statistics," Zeitschrift für Wahrscheinlichkeitstheorie und verwandte Gebiete, January 1979, v. 47, n. 1, p. 47-59, which is incorporated by reference herein for all purposes.

In lines 216-220, lines 217-219 are repeated for all values of k between 1 and J, as discussed above. Lines 220-223 end procedure 200 by identifying S*=arg max$_S$ F(S) over all relevant subsets of node activations within the autoencoder AE that is processing an image at runtime.

FIG. 3 is a flowchart showing step-by-step computation of a procedure 300 according to an illustrative embodiment of the present invention. Due to formatting constraints, decision points 350 and 380 are shown using boxes with rounded corners rather than using diamonds.

In step 310, a user inputs data and the trained autoencoder, as discussed above with reference to elements 110-130 in FIG. 1 and/or lines 201-203 in FIG. 2. In step 320, the model autoencoder and data are loaded into the subset toolbox, as discussed above with reference to elements 130-140 in FIG. 1 and/or lines 203-204 in FIG. 2. In step 330, autoencoder activations are extracted, as discussed above with reference to lines 205-211 in FIG. 2. In step 340, p-values are calculated, as discussed above with reference to line 212 in FIG. 2.

Step 350 determines whether there is a group scan over a proportion of images. If no, proceed to step 355, which includes a scoring function of p-values, as discussed above with reference to lines 214-224. If yes, proceed to step 365, which includes an iterative ascent method. After either step 355 or step 365, proceed to step 370, which includes performance metric generation and aggregated results with visualization, as discussed above with reference to elements 150-160 and further discussed below with reference to elements 480 and 490 in FIG. 4.

Step 380 determines whether the area under curve (AUC) is equal to 0.5. If the AUC is not equal to 0.5 (i.e., the AUC is greater than or less than 0.5), then go to step 385, which includes suggesting tailored mitigation actions, as discussed above with reference to element 160 in FIG. 1, then go to step 390. If the AUC is equal to 0.5, then skip step 385 and go directly to step 390, which includes updating the dashboard with results and visualizations, as discussed above with reference to element 160 in FIG. 1 and further discussed below with reference to element 490 in FIG. 4.

Figure 4:
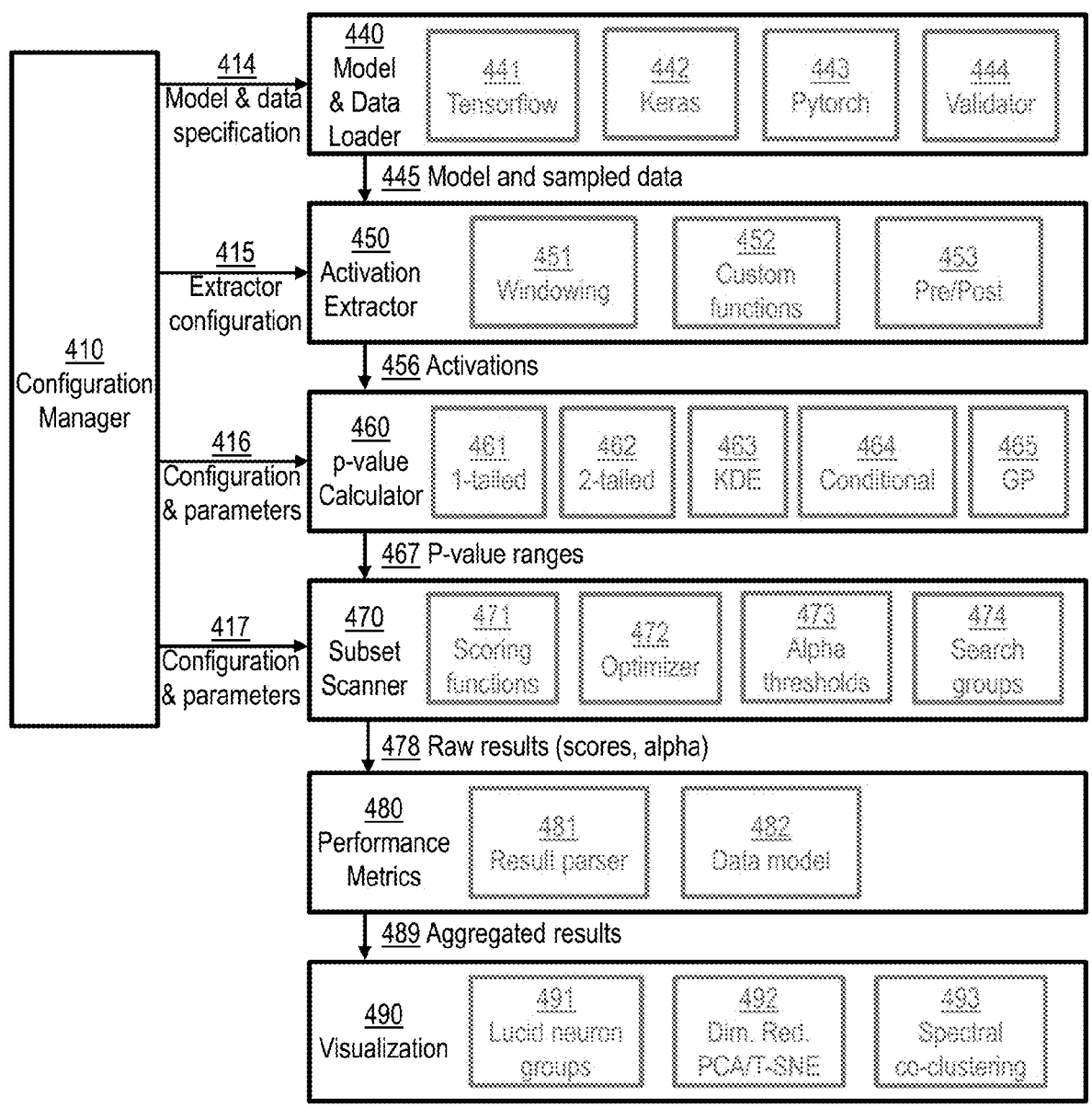
FIG. 4 is a combined block/flow diagram depicting exemplary system components and data flows according to an illustrative embodiment of the present invention.

FIG. 4 is a combined block/flow diagram depicting exemplary system components and data flows according to an illustrative embodiment of the present invention. Configuration manager 410 serves as an interface to the user for configuring the mode and parameters of operation of the core subset scanning. Configuration manager 410 samples from the dataset and provides the specifications of the model (such as how to read it, the kind of model), and attempts to create live situations where known anomalies are present in small percentage of the data.

Model and data loader 440 includes an extensible framework that loads the model and data based on the configuration provided by the simulator. Model and data loader 440 corresponds generally to elements 110-130 in FIG. 1, lines 201-204 in FIG. 2 and/or steps 310-320 in FIG. 3. In some embodiments, model and data loader 440 may support popular neural network frameworks, such as TensorFlow 441, Keras 442, PyTorch 443, and their respective data loading formats. (TensorFlow is a trademark of Google Inc.) Model and data loader 440 may also include a validator 444. Model and data loader 440 receives model and data specification 414 from configuration manager 410, and model and data loader 440 provides model and sampled data 445 to activation manager 450.

Activation extractor 450 extracts activations data from the autoencoder based on the specified configuration. Activation encoder 450 passes the data (background, suspected anomalous and clean) through the model network and extracts activations corresponding to the way it has been configured. Activation encoder 450 corresponds generally to lines 205-211 in FIG. 2 and/or step 330 in FIG. 3. Activation extractor 450 may include windowing 451 and custom functions 452, as well as pre- and post-processing 453. Activation extractor 450 receives extractor configuration 415 from configuration manager 410, and activation extractor 450 provides activations 456 to p-value calculator 460.

P-value calculator 460 calculates p-value ranges for clean and anomalous records using the background records. In an illustrative embodiment, p-value calculator 460 may implement several ways for doing this, including conditional 464, 1-tailed 461 and 2-tailed tests 462 as well as from a kernel density estimate (KDE) 463 and/or a Gaussian Process (GP) 465. P-value calculator 460 corresponds generally to line 212 in FIG. 2 and/or step 340 in FIG. 3. P-value calculator 460 receives configuration and parameters 416 from configuration manager 410, and p-value calculator 460 provides p-value ranges 467 to subset scanner 470.

Subset scanner 470 includes an implementation of FGSS extended to autoencoder networks, adversarial attacks, and out-of-distribution samples. Subset scanner 470 corresponds generally to element 140 in FIG. 1, lines 214-224 in FIG. 2 and/or steps 350-365 in FIG. 3. Subset scanner 470 may include scoring functions 471, optimizer 472, alpha thresholds 473, and search groups 474. Subset scanner 470 receives configuration and parameters 417 from configuration manager 410, and subset scanner 470 provides raw results (e.g., scores, alpha) 478 to performance metrics module 480.

Performance metrics module 480 calculates performance metrics from the raw results 478 of subject scanner 470. These performance metrics may include, for example, precision, recall, and detection power. Performance metrics module 480 corresponds generally to element 150 in FIG. 1 and/or steps 370-380 in FIG. 3. Performance metrics module 480 may include result parser 481 and data model 482. Performance metrics module 480 provides aggregated results 489 to visualization module 490.

Visualization module 490 visualizes raw results 478 and aggregated results 489. Visualization module 490 corresponds generally to element 160 in FIG. 1 and/or steps 370-390 in FIG. 3. Visualization module 490 may include spectral co-clustering 493 such as showing anomalous nodes comparisons with spectral co-cluster of nodes to identify if correlations of 'anomalies' with certain representation. In addition to spectral co-clustering 493, visualization module 490 may indicate lucid neuron groups 491. As discussed above with reference to element 160 in FIG. 1, visualization module 490 may be connected to a user computing device (e.g., via augmented reality glasses, virtual reality devices) to relay the information regarding which samples are anomalous coupled with an indication of potential malicious intent and information of which parts/nodes of the data make that sample anomalous.

Visualization module 490 may also perform dimensionality reduction 492, e.g., using Principal Component Analysis (PCA) and/or t-Distributed stochastic neighbor embedding (t-SNE). PCA is described in, e.g., Hotelling, "Analysis of a complex of statistical variables into principal components", Journal of Educational Psychology, v. 24, 1933, p. 417-441, which is incorporated by reference herein for all purposes. t-SNE is described in, e.g., van der Maaten et al., "Visualizing Data using t-SNE", Journal of Machine Learning Research (JMLR), v. 9, November 2008, p. 2579-2605, which is incorporated by reference herein for all purposes.

Figure 5:
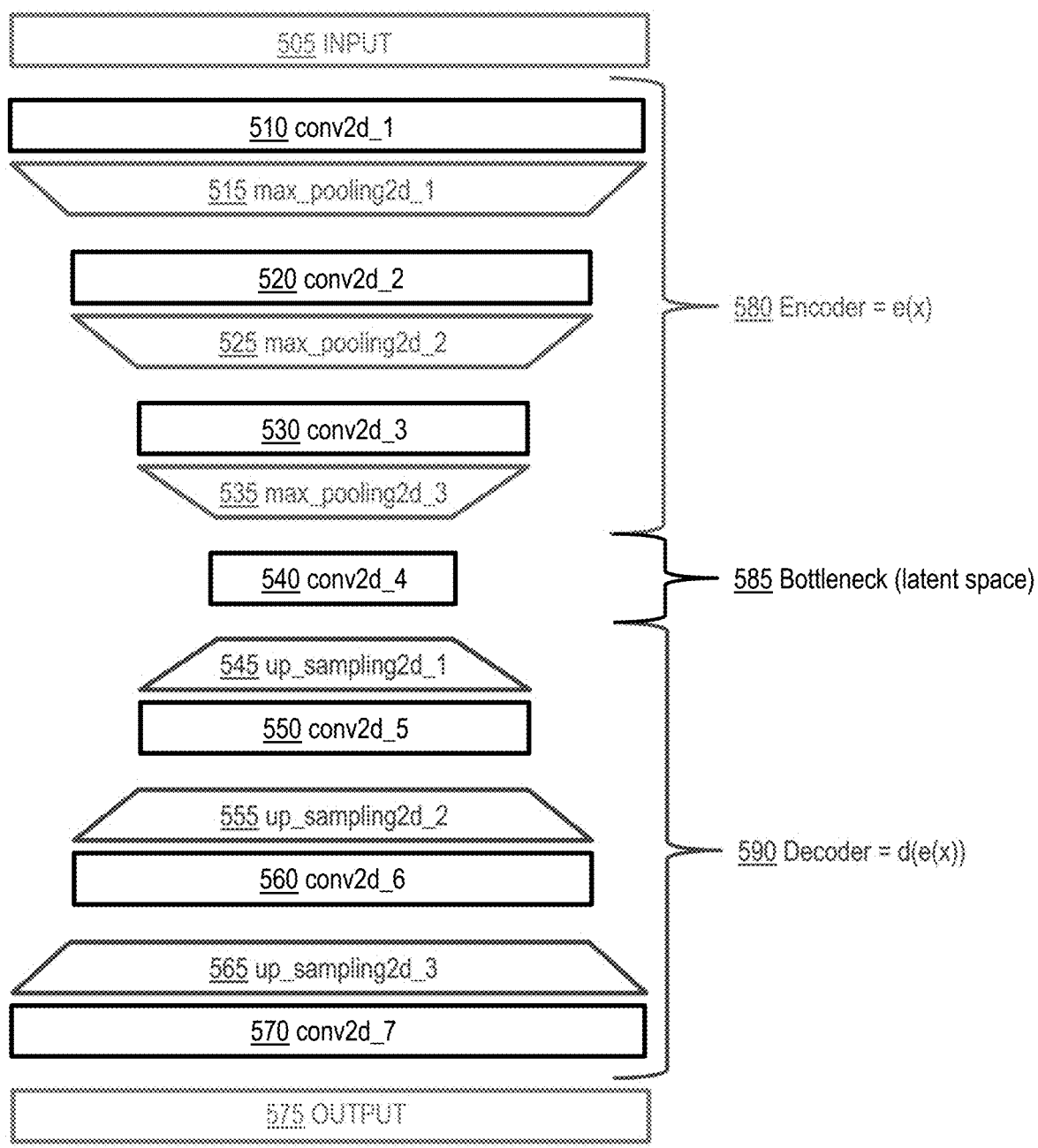
FIG. 5 shows an autoencoder suitable for use with an illustrative embodiment of the invention.

The inventors have implemented illustrative embodiments of the invention and performed experiments demonstrating illustrative embodiments of the invention demonstrate unexpected results and significantly superior performance relative to conventional techniques. FIG. 5 shows an autoencoder 500 suitable for use with an illustrative embodiment of the invention. The architecture of autoencoder 500 includes an encoder 580 and a decoder 590 (as well as bottleneck/latent space 585).

The encoder 580 (e: X→Z) is composed of layers that perform nonlinear dimensionality reduction from the high dimensional input space into a low-dimensional latent representation: z=e(x). The encoder 580 comprises three convolutional layers, each with ReLU activations (and, optionally, batch normalizations), and a maxpooling layer after every convolutional layer. Thus, the encoder 580 receives input 505 and includes, in order, first convolutional layer 510 (conv2d_1), first maxpooling layer 515 (max_pooling2d_1 or max_pool_1), second convolutional layer 520 (conv2d_2), second maxpooling layer 525 (max_pooling2d_2 or max_pool_2), third convolutional layer 530 (conv2d_3), and third maxpooling layer 535 (max_pooling2d_3 or max_pool_3).

The decoder 590 (d: Z→X) reconstructs the original sample from the latent representation: x'=d(e(x)). The decoder comprises four convolutional layers, each with ReLU activations (and, optionally, batch normalizations) except the final layer which uses a sigmoid. Each consecutive pair of convolutional layer is interspersed with an upsampling layer. Thus, the decoder 590 includes, in order, fourth convolutional layer 540 (conv2d_4), first upsampling layer 545 (up_sampling2d_1 or up_sampl_1), fifth convolutional layer 550 (conv2d_5), second upsampling layer 555 (up_sampling2d_2 or up_sampl_2), sixth convolutional layer 560 (conv2d_6), third upsampling layer 565 (up_sampling2d_2 or up_sampl_2), and seventh or final convolutional layer 570 (conv2d_7). The seventh or final convolutional layer 570 (conv2d_7) uses a sigmoid rather than the ReLU activations used for the other convolutional layers 510-560, and produces output 575. Note that the fourth convolutional layer 540 (conv2d_4) corresponds to the latent space, and may accordingly be considered to be a bottleneck 585 in addition to or instead of the first layer of the decoder 590.

Experiments were performed using popular datasets such as MNIST, Fashion-MNIST (F-MINST), and a more complex dataset CIFAR. MNIST is described in, e.g., LeCun et al., "Gradient Based Learning Applied to Document Recognition", Proceedings of IEEE, v. 86, n. 11, November 1998, p. 2278-2324, which is incorporated by reference herein for all purposes. F-MINST is described in, e.g., Xiao et al., "Fashion-MNIST: a Novel Image Dataset for Benchmarking Machine Learning Algorithms", Sep. 15, 2017, 6 pages, which is incorporated by reference herein for all purposes. CIFAR is described in, e.g., Krizhevsky, "Learning Multiple Layers of Features from Tiny Images", Apr. 8, 2009, p. 1-58, which is incorporated by reference herein for all purposes.

The same autoencoder architecture (4385 parameters) was trained for both F-MNIST and MNIST. A similar structure was used for CIFAR (52975 parameters), with additional Batch Normalization layers and input size and depth variations. The autoencoder was trained by minimizing the binary cross-entropy of the decoder output and the original input image using an adadelta optimizer for 100 epochs. See, e.g., Zeiler, "ADADELTA: An Adaptive Learning Rate Method", Dec. 22, 2012, 6 pages, which is incorporated by reference herein for all purposes.

Several adversarial attacks were generated for the experiments using standard datasets in order to measure the effectiveness of one or more illustrative embodiments of the present invention. The experiments discussed herein focused only on untargeted adversarial attacks with standard methods, including Basic Iterative Method (BIM), Fast Gradient Signal Method (FGSM or FGM), DeepFool (DF), and HopSkipJumpAttack (HSJ). The idea behind these attacks is to find a perturbation (often imperceptible to the human eye) to be included in the original sample X and generate an adversarial sample $X^{adv}$ that causes an incorrect classification.

For generating the attacks, a standard Convolutional Neural Network was trained for each dataset. The test accuracies for these models are 0.992 for MNIST, 0.921 for F-MNIST, and 0.903 for CIFAR. All untargeted attacks were generated with the Adversarial Robustness Toolbox, which is available from the assignee of the present application, International Business Machines Corp. The Adversarial Robustness Toolbox is further described in, e.g., Nicolae et al., "Adversarial Robustness Toolbox v1.0.0", Nov. 15, 2019, 34 pages, which is incorporated by reference herein for all purposes.

FGSM (or FGM) uses the sign of the gradient at every pixel to determine the direction with which to change the corresponding pixel value. Given an image x and its corresponding true label y, the FGSM attack sets the perturbation δ to: $X^{adv}=X+\varepsilon sign(\nabla_X J(X, y_{true}))$ where ε is a hyperparameter which controls how far a pixel is allowed to change from its original value when noise is added to the image, $y_{true}$ is the true class for the image X, and J(X, y) is the cross-entropy cost function of the neural network for image X and class y. FGSM is further described in, e.g., Goodfellow et al., "Explaining and Harnessing Adversarial Examples", International Conference on Learning Representations (ICLR), Mar. 20, 2015, 11 pages, which is incorporated by reference herein for all purposes.

BIM is an extension of FGSM where adversarial noise is applied multiple times iteratively with small step size: $X_0^{adv}=X$, $X_{N+1}^{adv}=Clip_{X,\varepsilon}\{X_N^{adv}+\varepsilon sign (\nabla_X J(X_N^{adv}, y_{true}))\}$ BIM is further described in, e.g., Kurakin et al., "Adversarial examples in the physical world", International Conference on Learning Representations (ICLR), Feb. 11, 2017, 14 pages, which is incorporated by reference herein for all purposes.

DF computes the optimal perturbation to perform a misclassification. The robustness of the model f for an input X is equal to the distance of the input to the hyper-plane that separates both classes. So the minimal perturbation to change the classifier decision is the orthogonal projection defined as:

$$-\frac{f(X)}{\|w\|_2^2} * w.$$

DF is further described in, e.g., Moosavi-Dezfooli et al., "DeepFool: A Simple and Accurate Method to Fool Deep Neural Networks", Proceedings of the IEEE Conference on Computer Vision and Pattern Recognition (CVPR), June 2016, p. 2574-2582, which is incorporated by reference herein for all purposes.

HSJ is a decision-based attack that assumes access to predicted outputs only. HSJ works by performing a binary search to find the decision boundary, estimating the gradient direction at the boundary point, and then updating the step size along the gradient direction until perturbation is successful. HSJ is further described in, e.g., Chen et al., "HopSkipJumpAttack: A Query-Efficient Decision-Based Attack", Sep. 17, 2019, 30 pages, which is incorporated by reference herein for all purposes.

For each of the experiments discussed herein, the inventors took M=|D$_{H_0}$|=7000 of the 10000 validation images and used them to generate the background activation distribution (D$_{H_0}$) at each of the activation nodes per each inner layer. These 7000 images form an expectation of "normal" activation behavior for the network, and they were not used again. The remaining 3000 images were used to form a "Clean" (C=1500) sample and an "Adversarial" (A=1500) noised sample. The set A only contains images that were successfully noised by each type of adversarial attack, meaning that those samples were misclassified from an original predicted label.

In a series of experiments discussed with reference to FIGS. 6-8, subset scanning patterns were studied across adversarial attacks and datasets to observe any common subset scanning behaviors across layers. For this, subset scanning was applied across all layers of the autoencoder (convolutional, batch normalization, max pooling and up-sampling) and the detection power was analyzed in each case.

In one set of experiments, using BIM as the attack and F-MNIST as the dataset, the autoencoder was trained with different levels of data poisoning: an autoencoder with 100% of clean samples, 1% of adversarial samples ($\delta$=0.01), and 9% of adversarial samples ($\delta$=0.09). Here, BIM was used with a value of $\epsilon$=0.01 in the scaled [0,1] pixel space over 100 steps.

FIGS. 6A-6M are graphs showing experimental results produced by one or more illustrative embodiments of the invention, specifically activations distribution for respective layers of an autoencoder. See the discussion above with reference to lines 204-212 of FIG. 2, step 330 in FIG. 3, and/or elements 450 and 456 in FIG. 4. FIGS. 6A-6M illustrate activations distributions (e.g., densities of activation values) for respective layers of the autoencoder 500 shown in FIG. 5 for adversarial BIM noise $\delta$=0.01 (i.e., 1%) over the F-MNIST dataset.

Figure 6A:
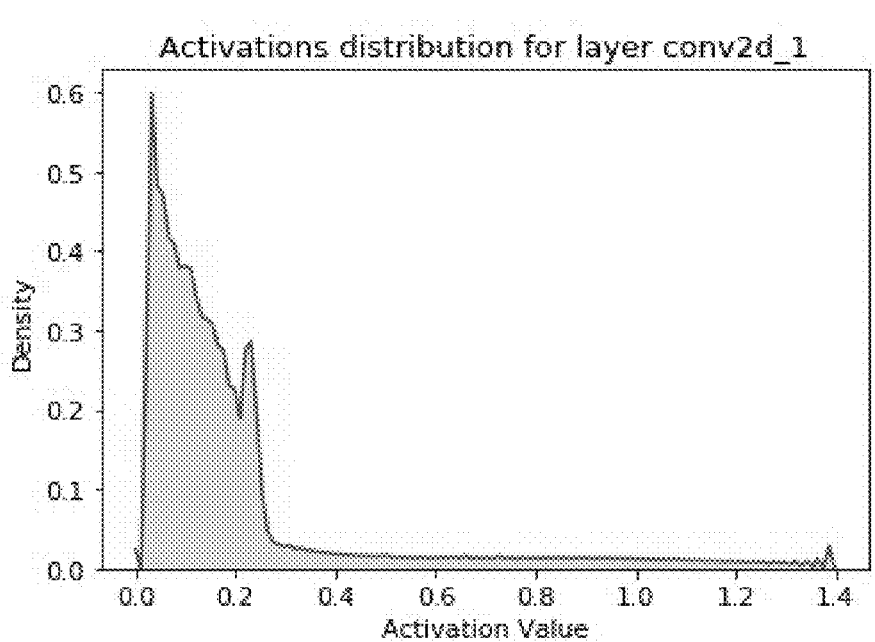
FIGS. 6A-6M are graphs showing experimental results produced by one or more illustrative embodiments of the invention, specifically activations distribution for respective layers of an autoencoder.
Figure 6B:
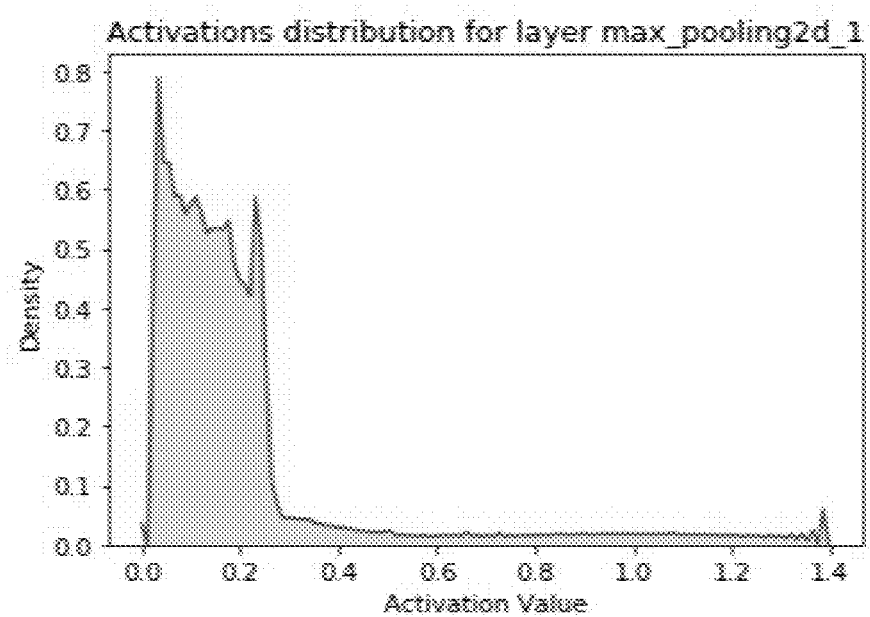
Figure 6C:
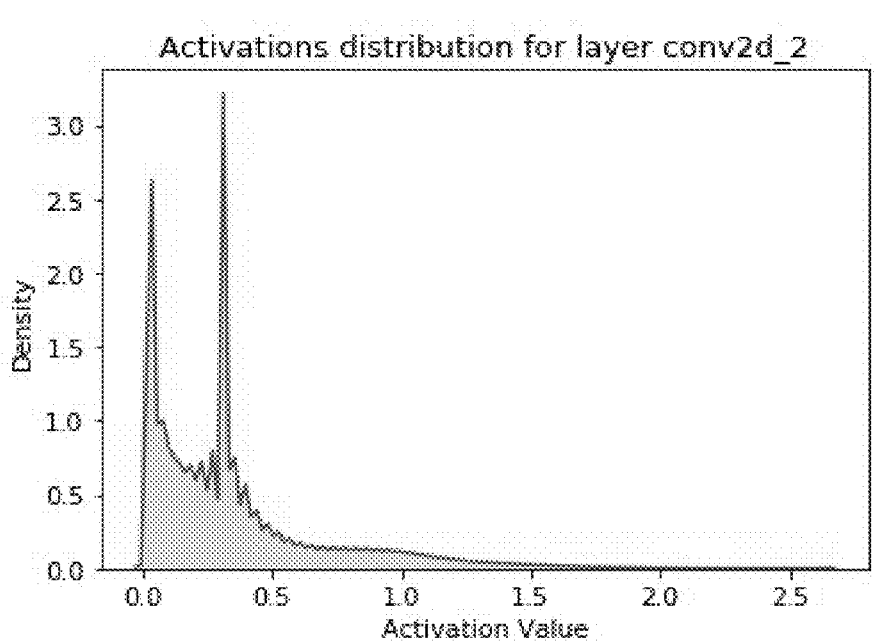
Figure 6D:
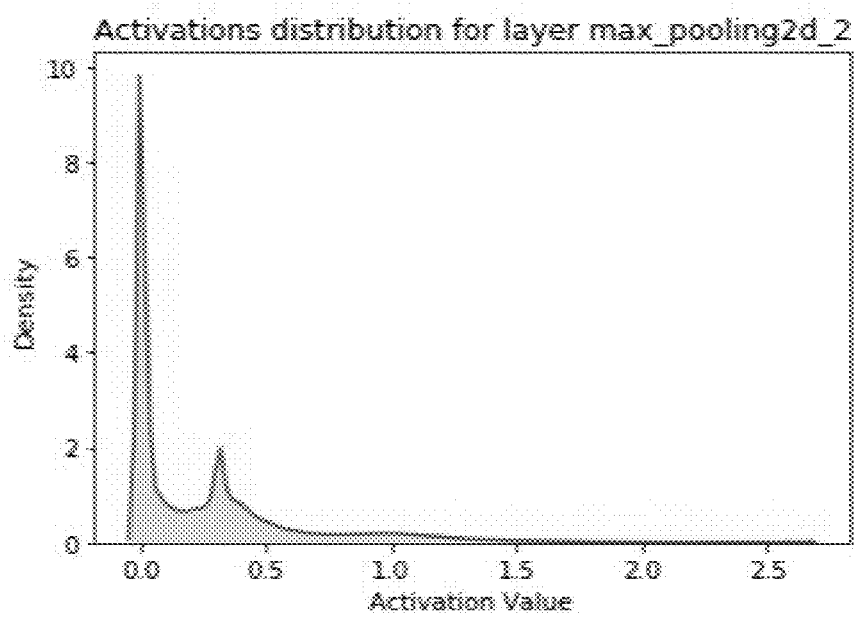
Figure 6E:
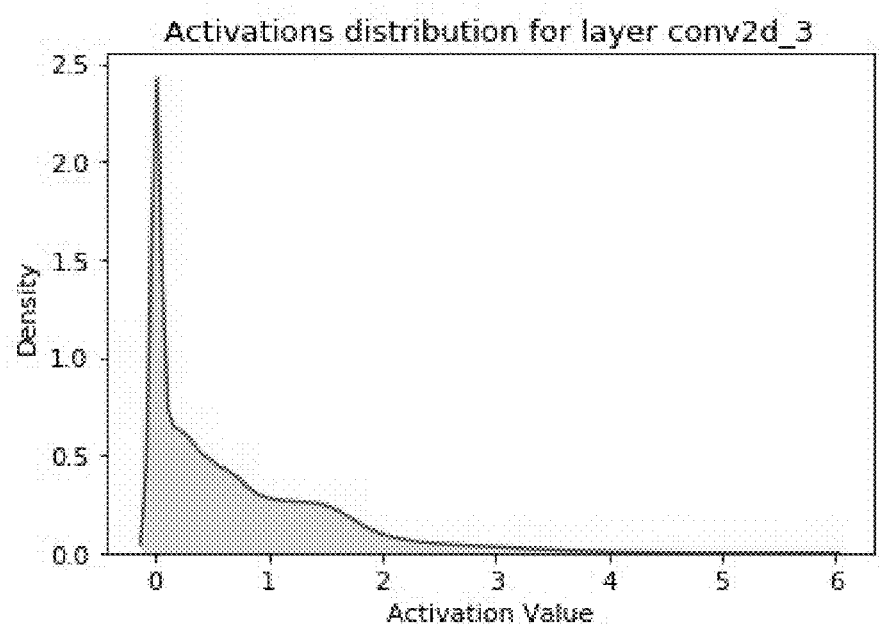
Figure 6F:
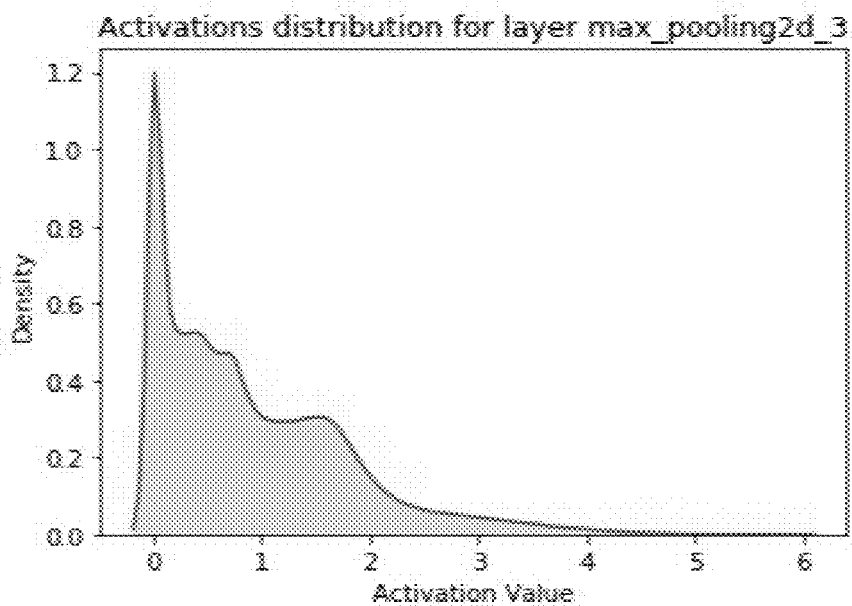
Figure 6G:
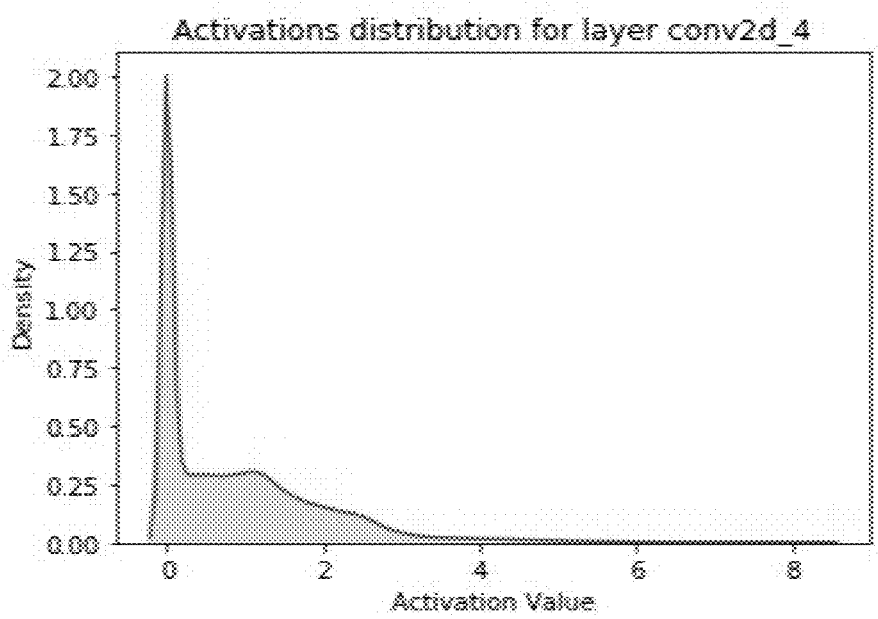

FIGS. 6A-6F show activations distributions for respective layers within the encoder 580 of the autoencoder 500 shown in FIG. 5. FIG. 6A shows activation distributions for layer conv2d_1, shown as 510 in FIG. 5. FIG. 6B shows activation distributions for layer max_pooling2d_1, shown as 515 in FIG. 5. FIG. 6C shows activation distributions for layer conv2d_2, shown as 520 in FIG. 5. FIG. 6D shows activation distributions for layer max_pooling2d_2, shown as 525 in FIG. 5. FIG. 6E shows activation distributions for layer conv2d_3, shown as 530 in FIG. 5. FIG. 6F shows activation distributions for layer max_pooling2d_3, shown as 535 in FIG. 5. FIG. 6G shows activation distributions for layer conv2d_4, shown as 540 within bottleneck 585 in FIG. 5.

Figure 6H:
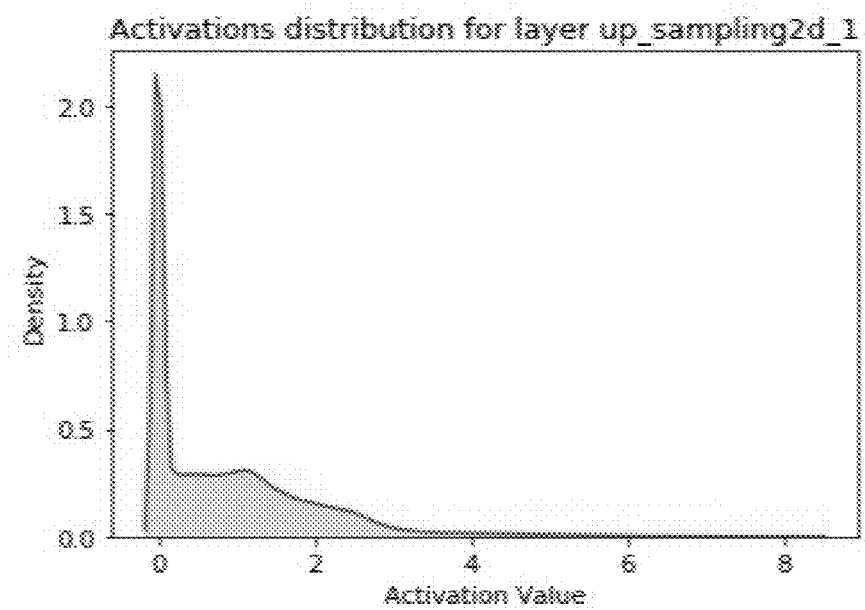
Figure 6I:
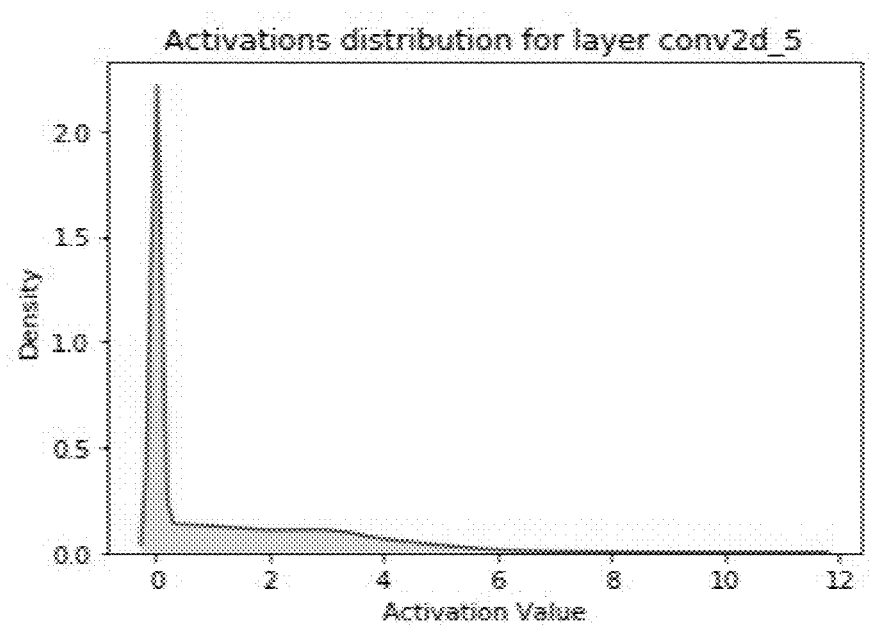
Figure 6J:
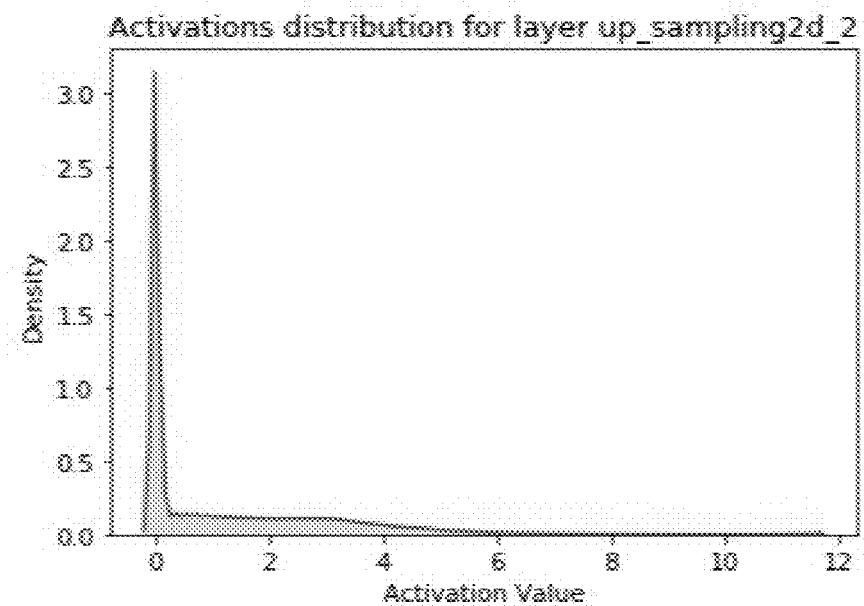
Figure 6K:
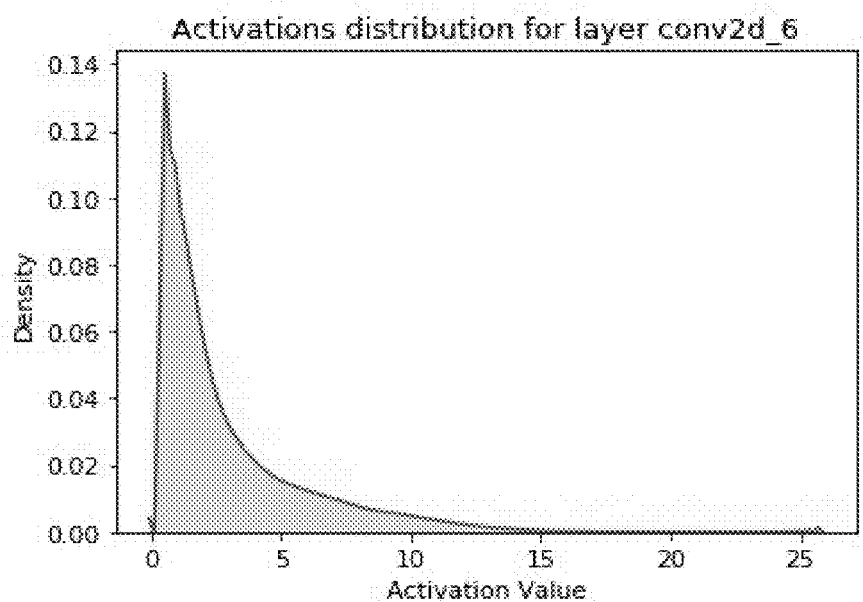
Figure 6L:
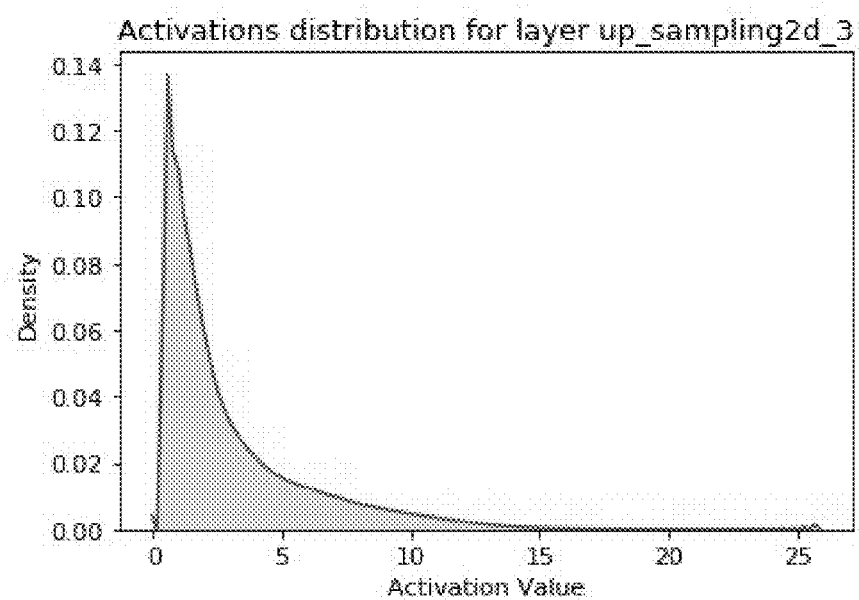
Figure 6M:
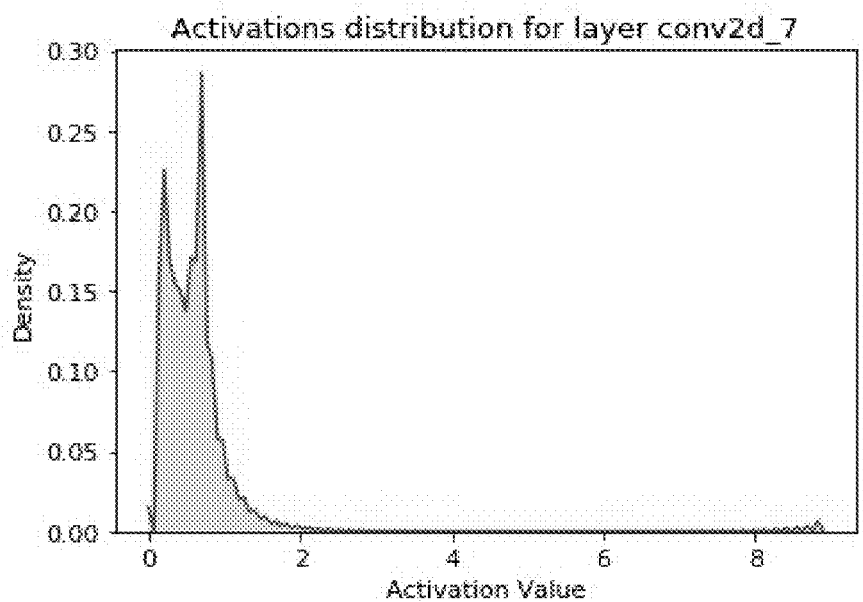

FIGS. 6H-6M show activations distributions for respective layers within the decoder 590 of the autoencoder 500 shown in FIG. 5. FIG. 6H shows activation distributions for layer up_sampling2d_1, shown as 545 in FIG. 5. FIG. 6I shows activation distributions for layer conv2d_5, shown as 550 in FIG. 5. FIG. 6J shows activation distributions for layer up_sampling2d_2, shown as 555 in FIG. 5. FIG. 6K shows activation distributions for layer conv2d_6, shown as 560 in FIG. 5. FIG. 6L shows activation distributions for layer up_sampling2d_3, shown as 565 in FIG. 5. FIG. 6M shows activation distributions for layer conv2d_7, shown as 570 in FIG. 5.

FIGS. 7A-7G are graphs showing experimental results produced by one or more illustrative embodiments of the invention, specifically subset-scanning score distributions per node in respective convolutional layers of an autoencoder. See the discussion above with reference to lines 213-223 of FIG. 2, steps 350-370 in FIG. 3, and/or elements 470 and 478 in FIG. 4. FIGS. 7A-7G illustrate subset-scanning score distributions (e.g., densities of subset scores) for respective convolutional layers of the autoencoder 500 shown in FIG. 5 over the F-MNIST dataset for clean data and for data with 1% adversarial BIM noise. The distributions of subset scanning scores are shown in blue for clean images (C, expected distribution), and in orange for noised samples (A).

Figure 7A:
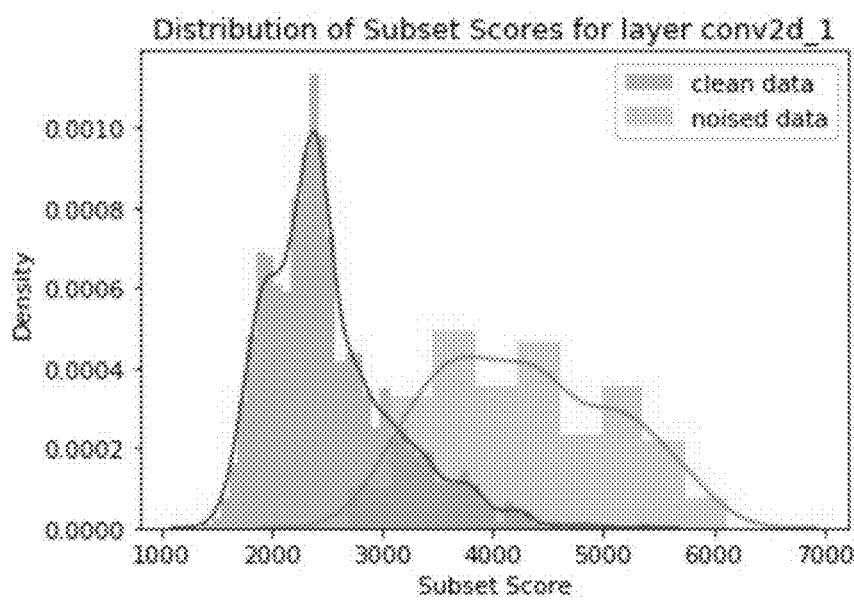
FIGS. 7A-7G are graphs showing experimental results produced by one or more illustrative embodiments of the invention, specifically subset-scanning score distributions per node for respective convolutional layers of an autoencoder.
Figure 7B:
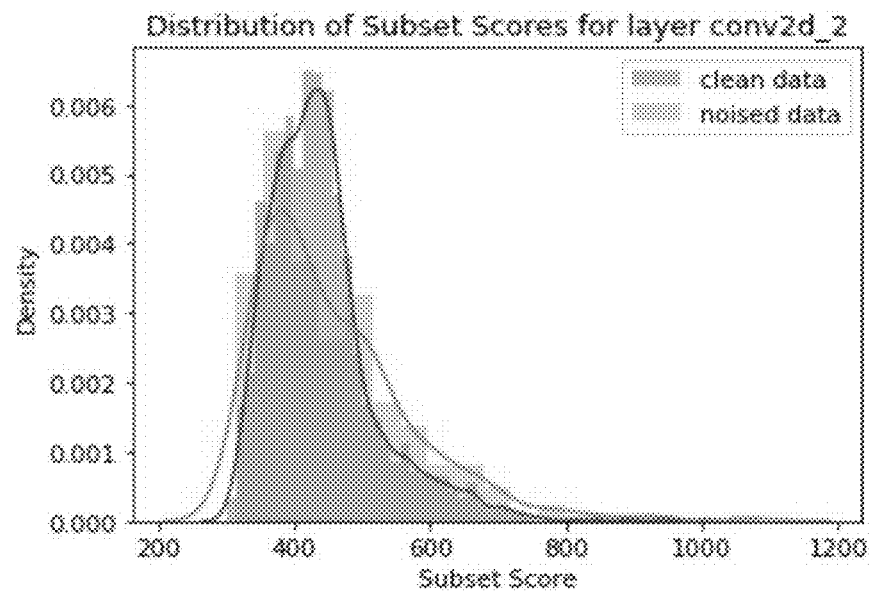
Figure 7C:
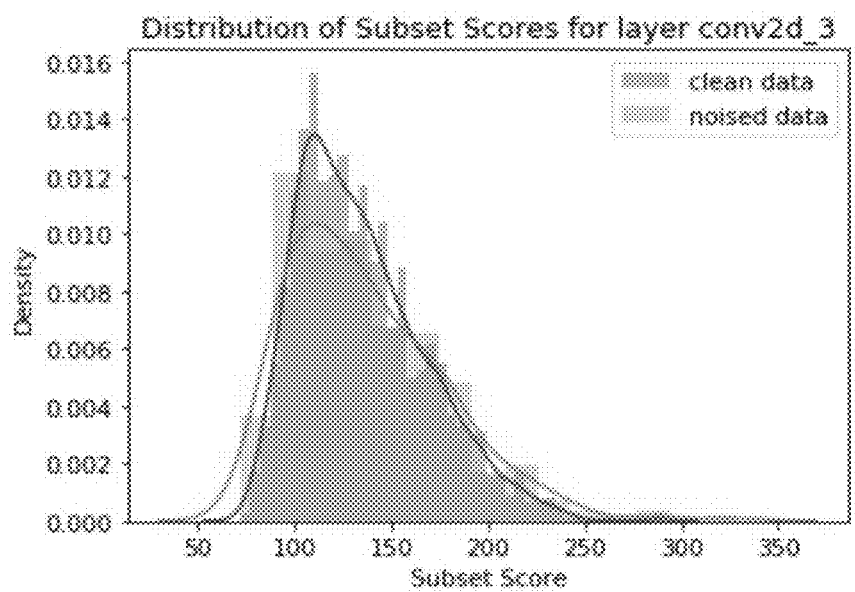
Figure 7D:
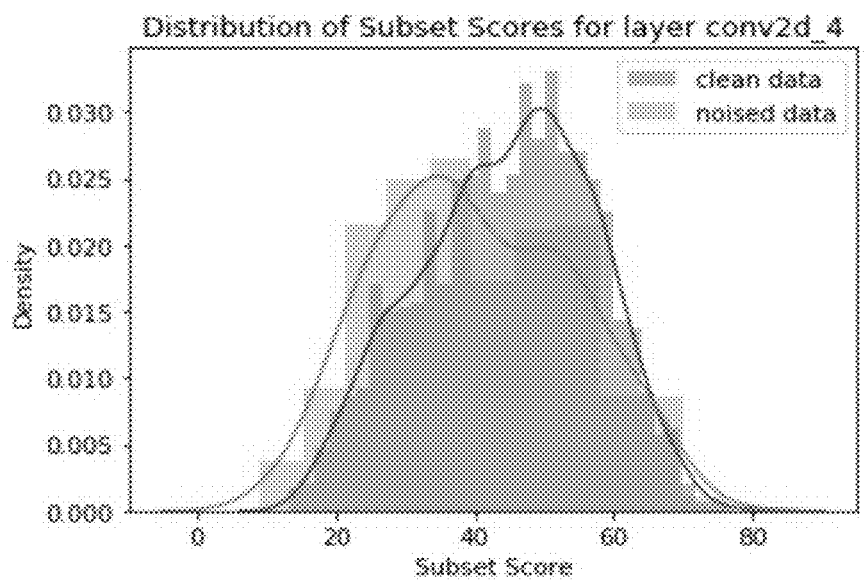
Figure 7E:
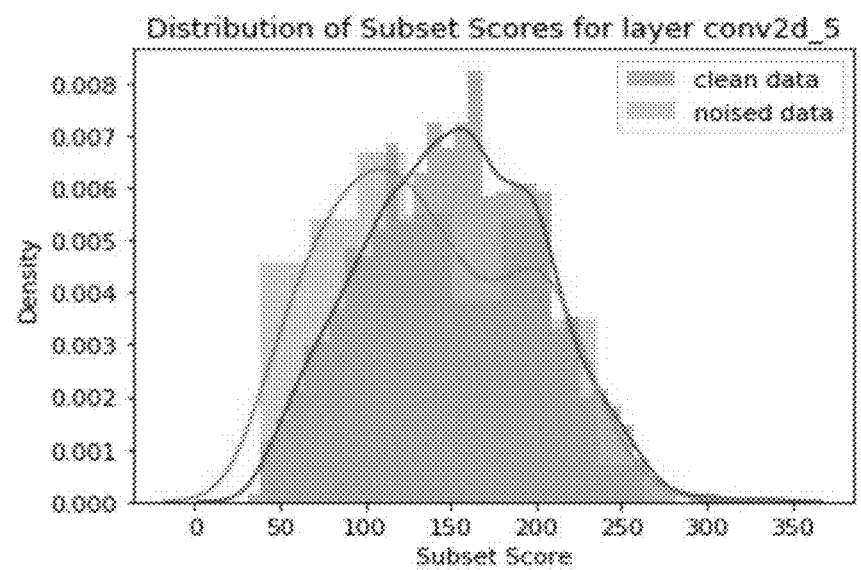
Figure 7F:
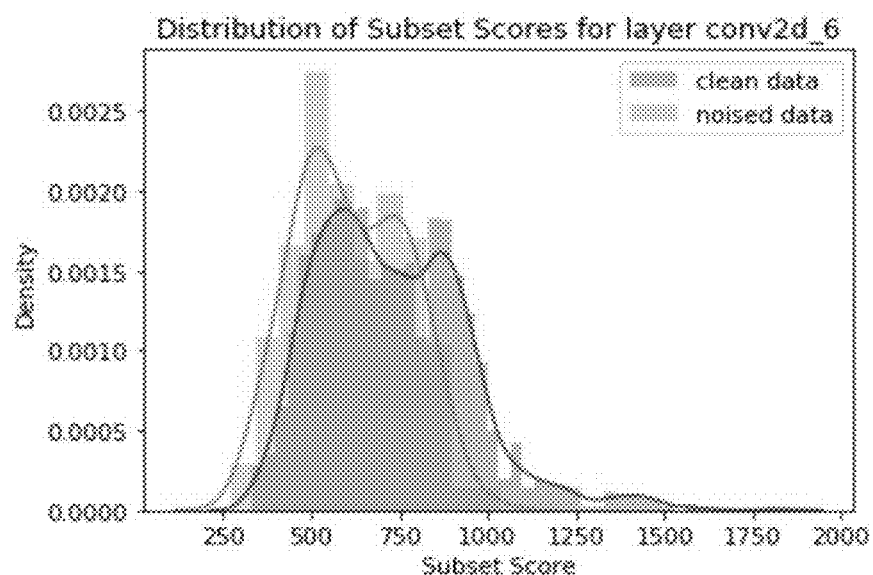
Figure 7G:
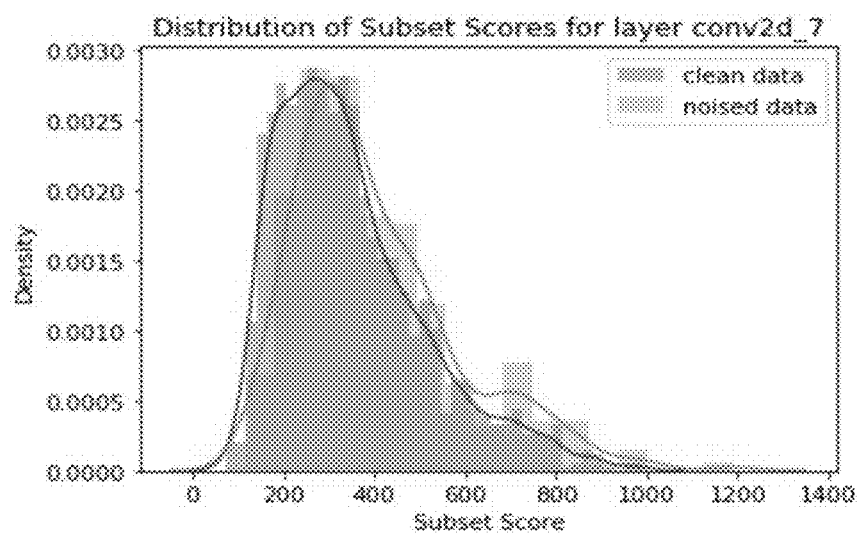

FIG. 7A shows subset-scanning score distributions for layer conv2d_1, shown as 510 in FIG. 5. FIG. 7B shows subset-scanning score distributions for layer conv2d_2, shown as 520 in FIG. 5. FIG. 7C shows activation distributions for layer conv2d_3, shown as 530 in FIG. 5. FIG. 7D shows activation distributions for layer conv2d_4, shown as 540 in FIG. 5. FIG. 7E shows activation distributions for layer conv2d_5, shown as 550 in FIG. 5. FIG. 7F shows activation distributions for layer conv2d_6, shown as 560 in FIG. 5. FIG. 7G shows activation distributions for layer conv2d_7, shown as 570 in FIG. 5.

Higher areas under curve (AUCs) are expected when distributions are separated from each other and lower AUCs are expected when the distributions overlap. In the latent space, the autoencoder abstracts basic representations of the images, losing subset scanning power due to the autoencoder mapping the new sample to the expected distribution. This can be seen as an almost perfect overlap of distribution shown in FIG. 7G for the final convolutional layer, conv_2d_7 (570 in FIG. 5). The computed AUC for the subset score distributions can be found in FIG. 8.

FIG. 8 is a table showing experimental results produced by one or more illustrative embodiments of the invention, specifically detection power for subset scanning over respective layers of autoencoder 500 shown in FIG. 5. The detection power is measured by the Area Under the Receiver Operating Characteristic Curve (AUROC), which is a threshold independent metric. See, e.g., Davis et al., "The relationship between precision-recall and roc curves", Proceedings of the 23rd international conference on Machine learning (ICML '06), June 2006, p. 233-240, which is incorporated by reference herein for all purposes.

FIG. 8 shows results for clean training over the F-MNIST and MNIST data sets using BIM, FGSM, DF, and HSJ adversarial attacks. FIG. 8 also shows results for the autoencoder 500 trained with 1% and 9% BIM noised samples over the F-MNIST data set. In the results shown in FIG. 8, the BIM and FGSM attacks used a value of $\epsilon$=0.01 in the scaled [0,1] pixel space over 100 steps, while the DF attack used standard $\epsilon$=1×10-6 and 100 iterations. FIG. 8 shows the detection power of an illustrative embodiment of the invention for individual subset scanning over all layers (convolutional, max pooling, and up-sampling layers) 510-570 of autoencoder 500, including the ability to handle sources with non-clean (noised) data.

FIG. 8 shows that, under different datasets and attacks, the same initial layers hold the highest detection power. In FIG. 8, across several datasets (noised under different models, and also with different proportions of noised samples during training), the first layers (conv_2d_1 and max pooling_2d_1, shown as 510 and 515 in FIG. 5) maintain a high performance regarding detection power (AUCROC) between 0.86 to 1.0 depending on dataset and noise attack.

FIG. 8 also shows the detection power of the subset scanning still performs correctly (above 0.82) for the cases where 1% and 9% of the samples are noised during training stage of the autoencoder.

Thus, applying subset scanning over the autoencoder's activations can produce a consistent and high detection power results across noise attacks, datasets, autoencoders architectures and different noised training levels in the initial layers. An illustrative embodiment may also include unsupervised methods for clustering in the latent space of an AE to group and detect different sources of adversarial attacks, where same source generated images would identify as a subset of inputs that have higher-than-expected activations at a subset of nodes.

Figure 9A:
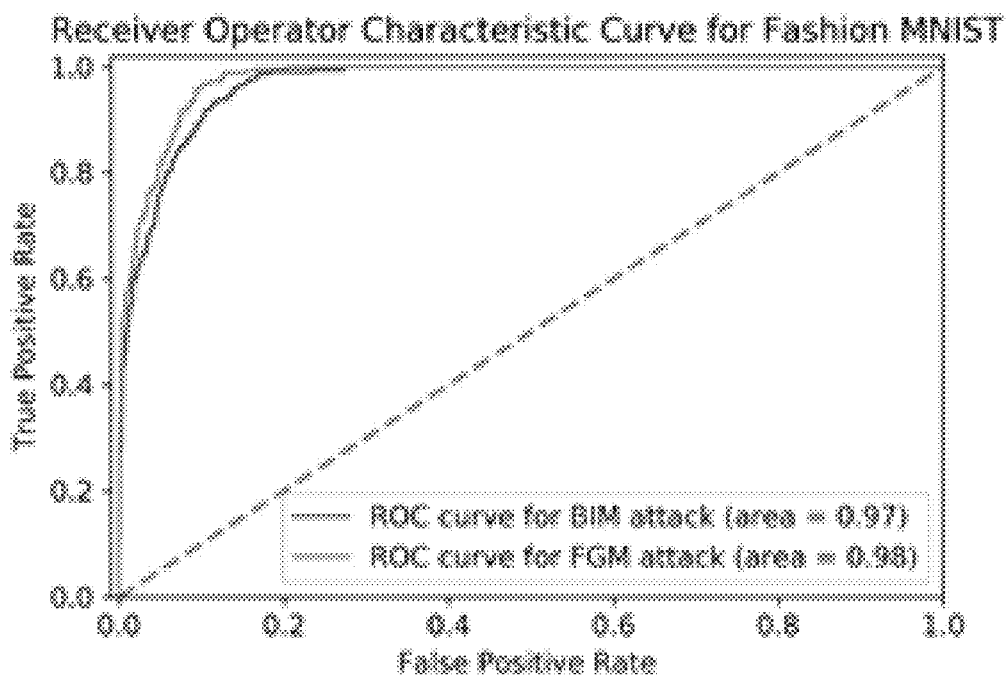
FIGS. 9A and 9B are graphs showing experimental results produced by one or more illustrative embodiments of the invention, specifically receiver operator characteristic (ROC) curves for noised cases as compared to scores from clean images.
Figure 9B:
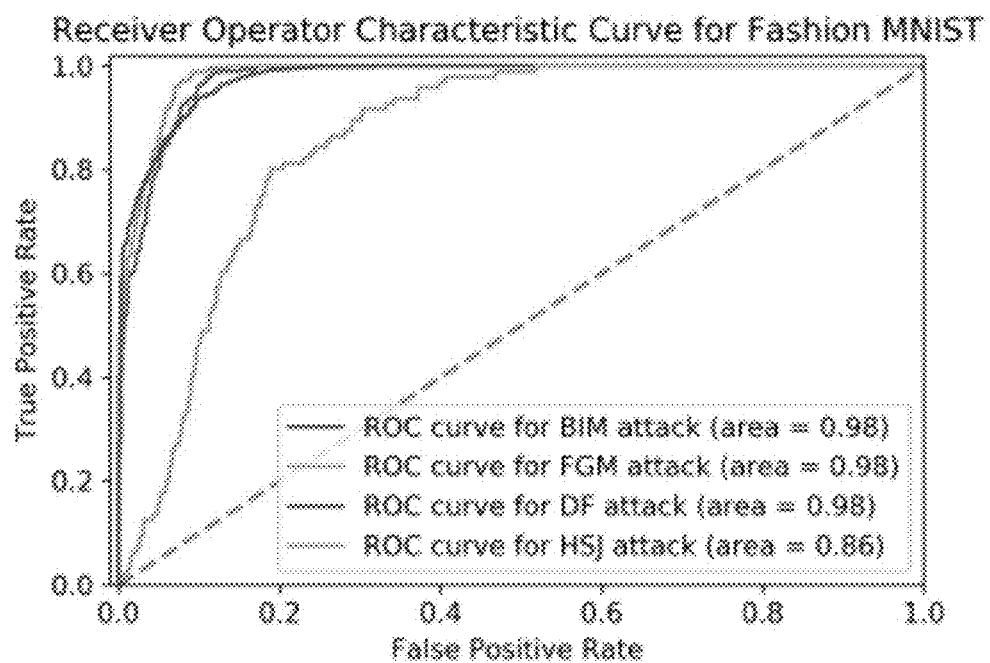

FIGS. 9A-9B and 10A-10B are graphs showing experimental results for the activations corresponding to the first convolutional layer conv2d_1, shown as 510 in FIG. 5, produced by one or more illustrative embodiments of the invention. More particularly, FIGS. 9A and 9B show receiver operator characteristic (ROC) curves for noised cases as compared to scores from clean images. FIGS. 9A and 9B show ROC curves (true positive rate vs. false positive rate) for various adversarial attacks under F-MNIST for the first convolutional layer conv2d_1, shown as 510 in FIG. 5. To facilitate comparison, FIGS. 9A and 9B also show scores from test sets containing all natural images (i.e., scores from clean images) for the first convolutional layer conv2d_1 as a dashed blue line. FIG. 9A shows a ROC curve for a BIM attack with an AUC=0.97 in green, and a ROC curve for a FGSM attack with AUC=0.98 in orange. FIG. 9B shows a ROC curve for a BIM attack with an AUC=0.98 in green, a ROC curve for an FGSM attack with AUC=0.98 in orange, a ROC curve for a DF attack with AUC=0.98 in purple, and a ROC curve for an HSJ attack with AUC=0.86 in pink. Here again, the BIM and FGSM attacks used a value of c=0.01 in the scaled [0,1] pixel space over 100 steps, while the DF attack used standard c=1×10-6 and 100 iterations.

Figure 10A:
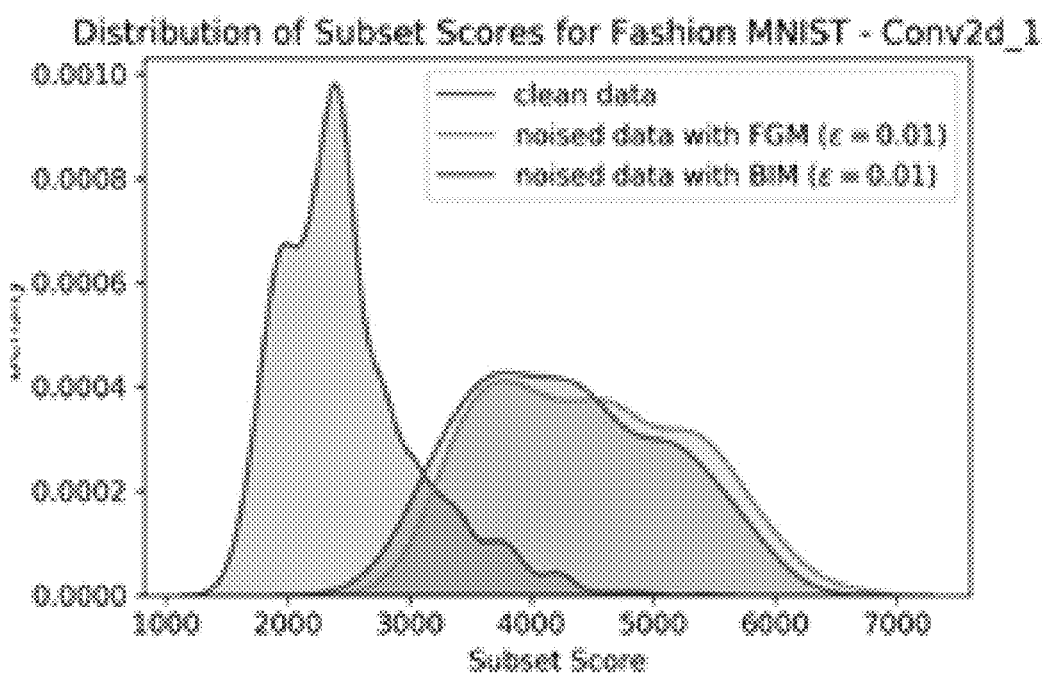
FIGS. 10A and 10B are graphs showing experimental results produced by one or more illustrative embodiments of the invention, specifically distribution of subset scores for images.
Figure 10B:
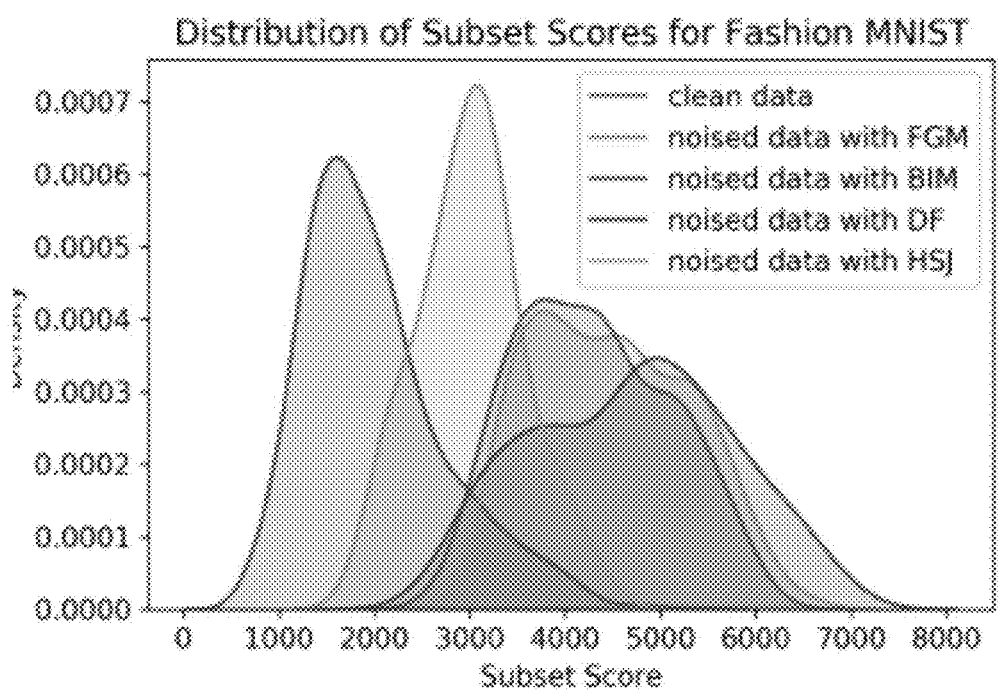

Like FIGS. 9A and 9B, FIGS. 10A and 10B also show experimental results for the activations corresponding to the first convolutional layer conv2d_1, shown as 510 in FIG. 5, produced by one or more illustrative embodiments of the invention. FIGS. 10A and 10B are graphs showing subset scores distribution for test sets of images over first convolutional layer conv2d_1, shown as 510 in FIG. 5. FIG. 10A shows the subset score distribution for clean data in blue, for noised data with FGSM in orange, and for noised data with BIM in green. FIG. 10B shows the subset score distribution for clean data in blue, for noised data with FGSM in orange, for noised data with BIM in green, for noised data with DF in purple, and for noised data with HSJ in pink. Here again, the BIM and FGSM attacks used a value of $\varepsilon$=0.01 in the scaled [0,1] pixel space over 100 steps, while the DF attack used standard $\varepsilon$=1×10-6 and 100 iterations. In both FIGS. 10A and 10B, sets containing all natural images (clean data shown in blue) had lower scores than test sets containing noised images, and a higher proportion of noised images resulted in higher scores.

In a series of experiments discussed with reference to FIGS. 11-13, the subset scanning method described with reference to FIGS. 1-3 was applied on the reconstruction error calculated over the input data and the last layer of the autoencoder (conv2d_7 shown as 570 in FIG. 5). FIG. 11 is a table showing experimental results produced by one or more illustrative embodiments of the invention, specifically the behavior of subset scanning over the reconstruction error space and the detection power (AUCROC) for different adversarial attacks and datasets. FIG. 11 shows results for the BIM, FGSM, DF, and HSJ attacks on the F-MNIST and MNIST datasets. Here again, the BIM and FGSM attacks used a value of $\varepsilon$=0.01 in the scaled [0,1] pixel space over 100 steps, while the DF attack used standard $\varepsilon$=1×10^-6 and 100 iterations.

The first column of results shows the detection power (AUCROC) for subset scanning over reconstruction error (RE) space using an illustrative embodiment of the present invention. FIG. 11 compares these results with two baselines for the autoencoder error space analysis. The second column of results in FIG. 11 used the detection capabilities of mean autoencoder reconstruction error distributions as described in, e.g., Sakurada et al., "Anomaly detection using autoencoders with nonlinear dimensionality reduction", Proceedings of the MLSDA 2014 2nd Workshop on Machine Learning for Sensory Data Analysis, December 2014, p. 4-11, which is incorporated by reference herein for all purposes. The third column of results in FIG. 11 used One-SVM over reconstruction error of the autoencoder as described in, Schölkopf et al., "Estimating the Support of a High-Dimensional Distribution", Neural Computation, v. 13, n. 7, July 2001, p. 1443-1471, which is incorporated by reference herein for all purposes.

FIG. 11 shows a difference of performance for the illustrative embodiment over the F-MNIST dataset. This may be due to autoencoder performance: loss for F-MNIST was 0.284 while loss for MNIST was 0.095. If an autoencoder's loss is high, it is more difficult to separate between clean and noised samples in the reconstruction space.

FIG. 12 is a table showing experimental results produced by one or more illustrative embodiments of the invention, specifically detection power for subset scanning using the FGSM attack with various c values. As discussed above, c is a hyperparameter which controls how far a pixel is allowed to change from its original value when noise is added to the image. Smaller values of c make the pattern subtler and harder to detect, but also less likely for the attacks to succeed in changing the class label to the target.

FIG. 12 compares illustrative embodiments of the present invention with the state-of-the-art detection method Defense-GAN as described in, e.g., Samangouei et al., "Defense-GAN: Protecting Classifiers Against Adversarial Attacks Using Generative Models", International Conference on Learning Representations (ICLR), May 18, 2018, 17 pages (hereinafter "Samangouei"), which is incorporated by reference herein for all purposes. In FIG. 12, the first column shows results for Defense-GAN, the second column shows results for an illustrative embodiment of the present invention with subset scanning over reconstruction error, and third column shows results for an illustrative embodiment of the present invention with subset scanning over activation's space. To facilitate comparison with Defense-GAN, rather than using c=0.01 for FGSM as in FIGS. 8-11, FIG. 12 shows results for FGSM using the c values proposed in Samangouei. For F-MNIST and MNIST, the FGSM attack uses c values of 0.01, 0.10, 0.15, 0.20, and 0.25. For CIFAR, the FGSM attack uses c values of 0.10, 0.15, 0.20, 0.25, and 0.30. FIG. 12 shows that, better results were obtained with higher c values.

FIGS. 11 and 12 provide results across c variations and datasets showing that subset scanning presents higher detection power than Mean Reconstruction Error distributions under clean and noise samples, unsupervised outliers detection method One-SVM and state-of-the-art method Defense-GAN. Moreover, subset scanning under the reconstruction error space allows for exploration and introspection of which nodes of the input image look anomalous. With this information, an illustrative embodiment is able to not only point out which image looks perturbed but also indicate which nodes make the input a noised sample, as shown in FIG. 13.

Figure 13A:
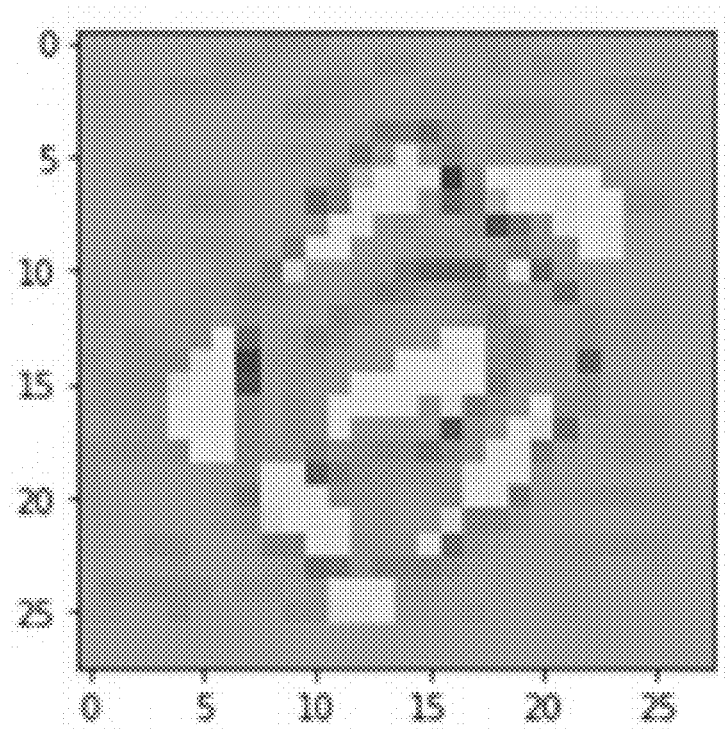
FIGS. 13A and 13B show experimental results produced by one or more illustrative embodiments of the invention, specifically exemplary visualizations of analogous nodes over reconstruction error for noised samples.
Figure 13B:
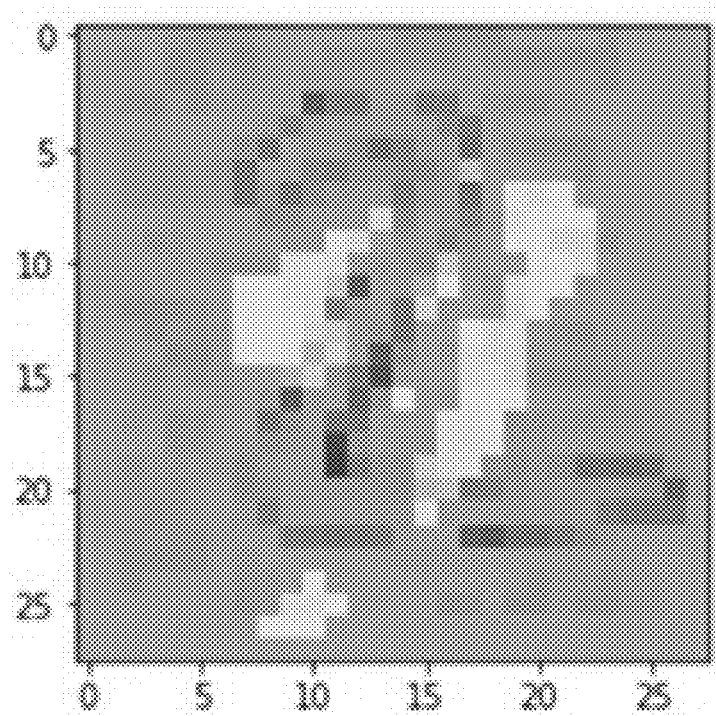

FIGS. 13A and 13B show experimental results produced by one or more illustrative embodiments of the invention, specifically exemplary visualizations of analogous nodes over reconstruction error for BIM noised samples (e.g., corrupted images). More particularly, FIGS. 13A and 13B show overlap of anomalous nodes (white) and reconstruction error (darker blue) per sample, such that nodes outside the contour will make the sample be classified as noised.

FIGS. 13A and 13B indicate that an illustrative embodiment can provide the ability to identify and visualize the set of anomalous nodes in the reconstruction error space that make noised samples. Thus, an illustrative embodiment is able to not only point out which image looks perturbed but also indicate which nodes make the input a noised sample. Moreover, an illustrative embodiment applied over the reconstruction error space can provide introspection capabilities that allow for identifying the nodes or portions of the input image that look anomalous. Consequently, an illustrative embodiment is able to not only point out which image looks anomalous but also effectively quantify, detect, and characterize the nodes that make the input a noised sample. An illustrative embodiment may provide detection of anomalous activity at the individual neuron level and/or detection of anomaly sources other than adversarial noise.

To recapitulate, an illustrative embodiment may include methods and systems to quantify, detect, and characterize data that is generated by an alternative process (e.g., anomalies, outliers, adversarial attacks, human input errors, etc.) using advanced subset scanning over deep autoencoder activations. Anomalous input can be detected by applying anomalous pattern detection techniques on autoencoder activation data. A first machine learning model may be trained to extract data (activations) for artificial neural networks (e.g., deep autoencoders) from a plurality of data sources that may contain one or more adversarial attacks. A second machine learning model may be trained to quantify the anomalousness of activations data within a neural network using the extracted activations data. A third machine learning model may be trained to detect when anomalous patterns are present for a given input. The first, second and third machine learning models may be used to characterize the anomaly by identifying the nodes participating in the anomalous pattern.

In an illustrative embodiment, a deep autoencoder processes original input data representing a plurality of non-adversarial original input data. An illustrative embodiment may then give a layer-wise score to determine if the sample is anomalous. For example, activations may be extracted from the deep autoencoder and characterized as belonging to either null hypothesis H0 or alternative hypothesis H1 distributions. Then, p-values may be computed and then scored using a non-parametric scan statistic (e.g., untethered to the underlying distribution of the null hypothesis H0) to identify highest-scoring subsets of the activations, e.g., the highest subsets of the activations that contribute to anomalous input.

Rather than merely generating an anomaly score as an aggregate of reconstruction error, an illustrative embodiment of the invention can pinpoint which features and/or nodes in a neural network contribute to the anomaly score. Thus, an illustrative embodiment can not only characterize a given input (e.g., image) as likely anomalous due to a high score, but can also determine which features from within the autoencoder are the culprits of that score.

An illustrative embodiment may also include detecting an anomalous image among a dataset of images using an adversarial autoencoder, and may also include computing a risk score of the detected anomalous input (e.g., image). Detecting of the anomalies may be performed on the latent representation space only, and may be done using a one-class support vector machine or a local outlier factor algorithm.

An illustrative embodiment may provide inspection and visualization of the set of anomalous nodes in the reconstruction error space that make a sample noised. Thus, an illustrative embodiment may include generating enriched results with interactive visualization of anomalous nodes in the input space and inner layers of the autoencoder. An illustrative embodiment may also include providing to the end user information regarding which samples are anomalous and information of which parts/nodes of the data make that sample anomalous. This may include prompting a user computing device (e.g., via augmented reality glasses, virtual reality devices) to relay the information regarding when samples are anomalous coupled with an indication of potential malicious intent when the risk score is above a threshold.

Illustrative embodiments advantageously provide an unsupervised method for anomaly detection under autoencoders activations. Thus, illustrative embodiments can detect a malicious actor performing a man-in-the-middle attack and adding an adversarial universal perturbation to inputs (e.g., from a sensor or imaging device). Illustrative embodiments may provide detection of anomalous activity at the individual neuron level and/or detection of anomaly sources other than adversarial noise. Illustrative embodiments combine detection with reconstruction combining detection with reconstruction error and subset scanning scores to improve the anomaly score of current autoencoders without requiring any retraining.

One or more embodiments of the invention, or elements thereof, can be implemented, at least in part, in the form of an apparatus including a memory and at least one processor that is coupled to the memory and operative to perform exemplary method steps.

Figure 14:
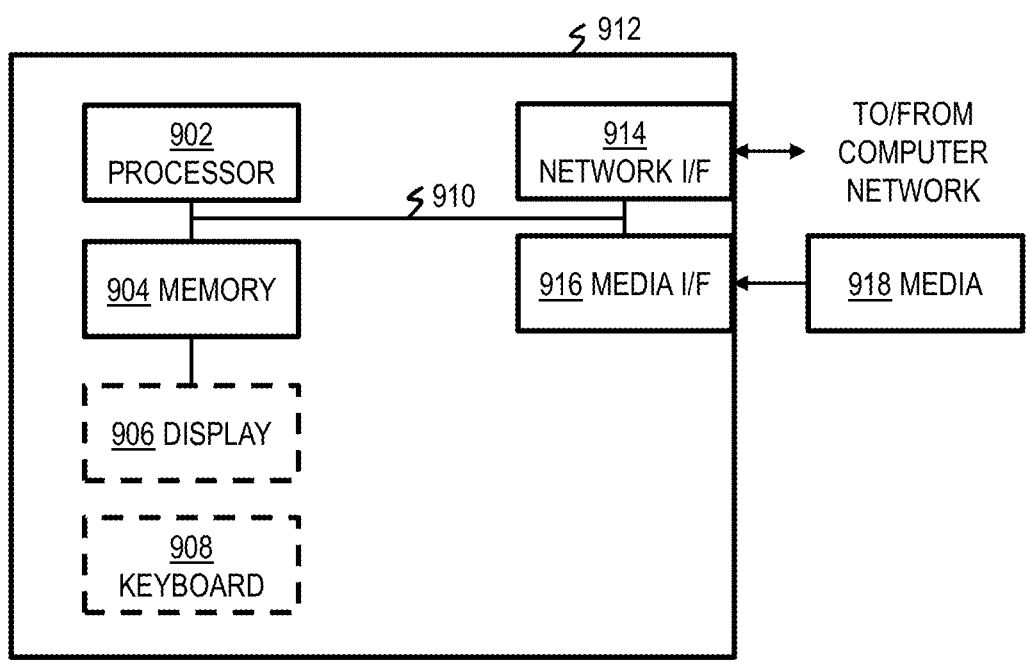
FIG. 14 shows a computer system that may be useful in implementing one or more aspects and/or elements of the invention.

One or more embodiments can make use of software running on a general purpose computer or workstation. With reference to FIG. 14, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 902. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting whether a given item within input data is anomalous, the method comprising steps of:
    extracting activations at respective nodes of an autoencoder trained on the data, the activations comprising activations at the respective nodes for the given item within the data and for one or more other items within the data;
    calculating p-values corresponding to the respective nodes, wherein the p-value for a given node represents a proportion of the activations at the given node for the other items which are greater than the activations at the given node for the given item;
    determining at least one score at least in part by scanning for a subset of the respective nodes which maximizes a statistical scoring function applied to the corresponding p-values, wherein determining the at least one score comprises determining a respective score for each inner layer of the autoencoder; and
    providing a visualization of at least the given item within the input data to a human user, wherein the visualization comprises unsupervised clustering in latent representation space of the autoencoder and the visualization further comprises one or more tailored mitigation actions suggested when a risk score exceeds a threshold, the risk score exceeding the threshold indicating that the given item is anomalous and corresponds to an adversarial attack.

2. The method of claim 1, wherein the statistical scoring function comprises one or more non-parametric scan statistics (NPSS) satisfying a linear-time subset scanning (LTSS) property.

3. The method of claim 2, wherein the scanning comprises:
    sorting nodes by corresponding p-values, where N is a total number of nodes sorted; and
    for each value k between 1 and N, determining:
        a subset $S_k$ of k nodes with smallest p-values of the N nodes; and
        a threshold $\alpha_k$ equal to a largest p-value of the k nodes within the subset $S_k$.

4. The method of claim 1, wherein the statistical scoring function comprises a log-likelihood ratio statistic.

5. The method of claim 1, further comprising computing one or more performance metrics at least in part by aggregating the at least one score, the one or more performance metrics comprising at least one of precision, recall, detection power, area under curve, and receiver operating characteristic.

6. The method of claim 1, wherein the visualization is provided to the human user through at least one of augmented reality and virtual reality.

7. The method of claim 1, wherein the visualization comprises information regarding which items within the input data are anomalous coupled with an indication of potential malicious intent.

8. The method of claim 1, wherein the visualization indicates which of the respective nodes cause the given item to be detected as anomalous.

9. The method of claim 1, wherein calculating the p-values comprises calculating p-value ranges using at least one of conditional, one-tailed, and two-tailed tests.

10. The method of claim 1, wherein the visualization comprises at least one of spectral co-clustering and lucid neuron groups.

11. The method of claim 1, wherein the visualization comprises dimensionality reduction using at least one of principal component analysis (PCA) and t-distributed stochastic neighbor embedded (t-SNE).

12. The method of claim 1, wherein the clustering comprises use of at least one of a one-class support vector machine and a local outlier algorithm.

13. The method of claim 1, wherein the subset scanning is over at least one of an activation space and a representation error space of the autoencoder.

14. The method of claim 1, wherein the given item is anomalous when generated by at least one of an adversarial attack and an annotation error.

15. The method of claim 1, wherein the input data comprises at least one of image data, audio data, video data, and tabular data.

16. An apparatus for detecting whether a given item within input data is anomalous, the apparatus comprising:
  a memory; and
  at least one processor coupled to the memory, the processor being operative:
    to extract activations at respective nodes of an autoencoder trained on the data, the activations comprising activations at the respective nodes for the given item within the data and for one or more other items within the data;
    to calculate p-values corresponding to the respective nodes, wherein the p-value for a given node represents a proportion of the activations at the given node for the other items which are greater than the activations at the given node for the given item;
    to determine at least one score at least in part by scanning for a subset of the respective nodes which maximizes a statistical scoring function applied to the corresponding p-values, wherein determining the at least one score comprises determining a respective score for each inner layer of the autoencoder; and
    to provide a visualization of at least the given item within the input data to a human user, wherein the visualization comprises unsupervised clustering in latent representation space of the autoencoder and the visualization further comprises one or more tailored mitigation actions suggested when a risk score exceeds a threshold, the risk score exceeding the threshold indicating that the given item is anomalous and corresponds to an adversarial attack.

17. A computer program product for detecting whether a given item within input data is anomalous, the computer program product comprising a non-transitory machine-readable storage medium having machine-readable program code embodied therewith, said machine-readable program code comprising machine-readable program code configured:
  to extract activations at respective nodes of an autoencoder trained on the data, the activations comprising activations at the respective nodes for the given item within the data and for one or more other items within the data;
  to calculate p-values corresponding to the respective nodes, wherein the p-value for a given node represents a proportion of the activations at the given node for the other items which are greater than the activations at the given node for the given item;
  to determine at least one score at least in part by scanning for a subset of the respective nodes which maximizes a statistical scoring function applied to the corresponding p-values, wherein determining the at least one score comprises determining a respective score for each inner layer of the autoencoder; and
  to provide a visualization of at least the given item within the input data to a human user, wherein the visualization comprises unsupervised clustering in latent representation space of the autoencoder and the visualization further comprises one or more tailored mitigation actions suggested when a risk score exceeds a threshold, the risk score exceeding the threshold indicating that the given item is anomalous and corresponds to an adversarial attack.

18. The method of claim 1, further comprising carrying out at least one of the one or more tailored mitigation actions.

19. The apparatus of claim 16, wherein the at least one processor is further configured to facilitate carrying out at least one of the one or more tailored mitigation actions.

20. The computer program product of claim 17, wherein the machine-readable program code configured is further configured to facilitate carrying out at least one of the one or more tailored mitigation actions.

* * * * *